United States Patent
Pastorina et al.

(10) Patent No.: US 11,381,160 B2
(45) Date of Patent: Jul. 5, 2022

(54) VARIABLE SWITCHING FREQUENCY SWITCHED TANK CONVERTERS AND ASSOCIATED METHODS

(71) Applicant: Maxim Integrated Products, Inc., San Jose, CA (US)

(72) Inventors: Salvatore G. Pastorina, Catania (IT); Tonio Gaetano Biondi, Catania (IT); Thurein Soe Paing, San Jose, CA (US); Andrea Pizzutelli, Redwood City, CA (US); Michael D. McJimsey, Danville, CA (US); Andrew J. Burstein, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 233 days.

(21) Appl. No.: 16/736,266

(22) Filed: Jan. 7, 2020

(65) Prior Publication Data

US 2020/0220461 A1 Jul. 9, 2020

Related U.S. Application Data

(60) Provisional application No. 62/789,232, filed on Jan. 7, 2019.

(51) Int. Cl.
*H02M 3/07* (2006.01)
*H02M 3/158* (2006.01)
*H02M 1/00* (2006.01)
*H02M 3/335* (2006.01)

(52) U.S. Cl.
CPC ............. *H02M 3/07* (2013.01); *H02M 3/158* (2013.01); *H02M 1/0058* (2021.05); *H02M 3/335* (2013.01)

(58) Field of Classification Search
CPC ..................... H02M 3/07–078; H02M 3/158
See application file for complete search history.

(56) References Cited

U.S. PATENT DOCUMENTS

| 7,660,133 | B1 | 2/2010 | Hwang et al. |
| 8,339,813 | B2 | 12/2012 | Wang et al. |
| 9,071,150 | B2 | 6/2015 | Zhang et al. |
| 9,806,621 | B1 | 10/2017 | Babazadeh |

(Continued)

OTHER PUBLICATIONS

Keeping (2014) "The advantages of pulse frequency modulation for DC/DC switching voltage converters," The Advantages of Pulse Frequency Modulation | DigiKey, 7 pp. [Retrieved at: https://www.digikey.com/en/articles/techzone/2014/mar/the-advantages-of-pulse-frequency-modulation-for-dc-dc-switching-voltage-converters].

(Continued)

*Primary Examiner* — Rafael O De Leon Domenech
(74) *Attorney, Agent, or Firm* — Lathrop GPM LLP

(57) ABSTRACT

A method for controlling a switched tank converter (STC) includes (a) driving a first resonant tank circuit of the STC at a first frequency and with a first fixed on-time, to obtain a first fixed ratio of output voltage of the STC to input voltage of the STC, while the STC is powering a load having a first magnitude and (b) driving the first resonant tank circuit of the STC at a second frequency and with the first fixed on-time, to obtain the first fixed ratio of output voltage of the STC to input voltage of the STC while the STC is powering a load having a second magnitude. The second frequency is smaller than the first frequency, and the second magnitude is smaller than the first magnitude.

20 Claims, 17 Drawing Sheets

(56) References Cited

U.S. PATENT DOCUMENTS

| | | |
|---|---|---|
| 10,050,530 B2 | 8/2018 | Stratakos et al. |
| 2020/0153331 A1* | 5/2020 | Li .......................... H02M 3/07 |
| 2020/0153347 A1* | 5/2020 | Li ..................... H02M 3/33569 |

OTHER PUBLICATIONS

Salem et al. (2017) "Comparison of LCL resonant converter with fixed frequency, and variable frequency controllers," 2017 IEEE, 6 pp.

Texas Instruments (Aug. 2014) "TPS6240x 2.25-MHz 400-mA and 600-mA dual step-down converter in small 3-mm and 2-mm VSON package," 44 pp.

* cited by examiner

VARIABLE SWITCHING FREQUENCY SWITCHED TANK CONVERTERS AND ASSOCIATED METHODS

RELATED APPLICATIONS

This application claims benefit of priority to U.S. Provisional Patent Application Ser. No. 62/789,232, filed on Jan. 7, 2019, which is incorporated herein by reference.

BACKGROUND

A switched tank converter (STC) is a resonant converter which includes one or more switching stages where each switching stage operates with a fixed on-time. A ratio of output voltage to input voltage is fixed, and the ratio is determined by the number of switching stages and connections between the switching stages. For example, in some STCs, a ratio of output voltage to input voltage is fixed at fifty percent, while in some other STCs, a ratio of output voltage to input voltage is fixed at twenty five percent. STCs operate with zero current switching and therefore may be capable of achieving high efficiency.

Applications of STCs include, but are not limited to, generating an unregulated intermediate-voltage power supply rail from a high-voltage power supply rail, where the intermediate-voltage power supply rail powers one or more point of load voltage regulators. For example, a STC may be used to generate an unregulated 12 volt power supply rail from a 48 volt power supply rail, and a point of load regulator may be used to generate a low-voltage (e.g., less than 5 volts) power supply rail from the unregulated 12 volt power supply rail, where the low-voltage power supply rail is used to power one or more devices requiring a tightly regulated, low-voltage power supply.

DETAILED DESCRIPTION OF THE EMBODIMENTS

While a conventional STC may achieve high efficiency at moderate load magnitude, Applicant has determined that a conventional STC may suffer from low efficiency at light load magnitude. In particular, a STC will achieve peak efficiency at a load magnitude where conduction losses are approximately equal to switching losses. As load magnitude is reduced, conduction losses decrease, but switching losses remain essentially unchanged. Consequently, efficiency at light load magnitude is typically poor.

Figure 1:
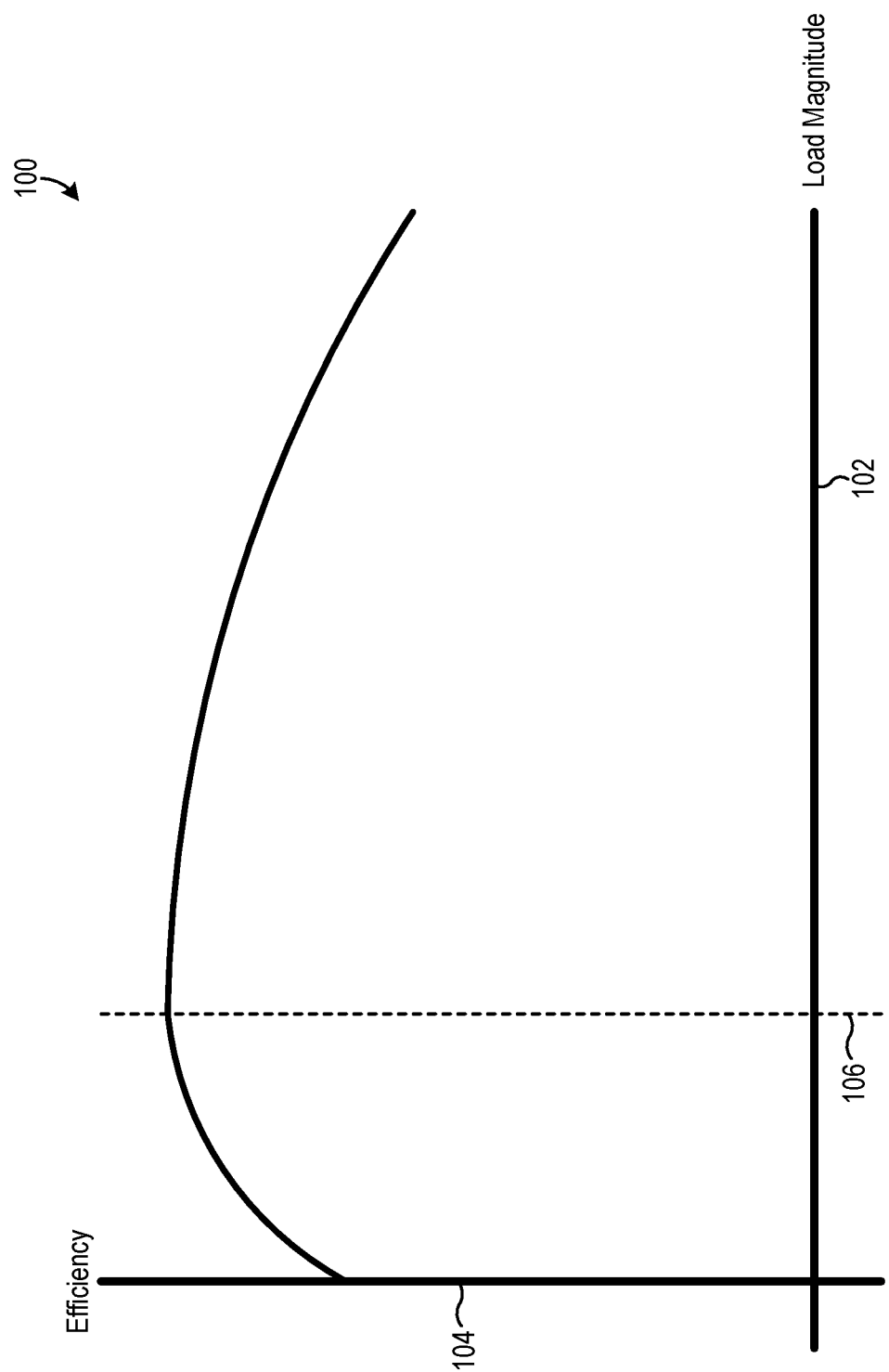
FIG. 1 is a graph illustrating efficiency as a function of load magnitude for a hypothetical conventional STC.

For example, FIG. 1 is a graph 100 illustrating efficiency as a function of load magnitude for a hypothetical conventional STC. Horizontal axis 102 represents load magnitude, and vertical axis 104 represents efficiency of the STC. Peak efficiency occurs at a load magnitude 106 where conduction losses are approximately equal to switching losses, and efficiency significantly drops as load magnitude is reduced below load magnitude 106.

Applicant has developed variable switching frequency STCs and associated methods which may at least partially overcome the light load magnitude efficiency limitations of conventional STCs discussed above. In particular, while conventional STCs operate at a fixed switching frequency, the new STCs developed by Applicant have a variable switching frequency, e.g., the switching frequency is at least partially a function of load magnitude. In certain embodiments, the switching frequency decreases as load magnitude decreases, thereby causing switching losses to decrease as load magnitude decreases. Consequently, in particular embodiments, efficiency does not significantly decrease as load magnitude is decreased, such that high efficiency may be achieved at light load magnitude. Additionally, reducing switching frequency as load magnitude decreases may promote fast transient response by maintaining a high peak resonant tank circuit current at light load magnitude.

Figure 2:
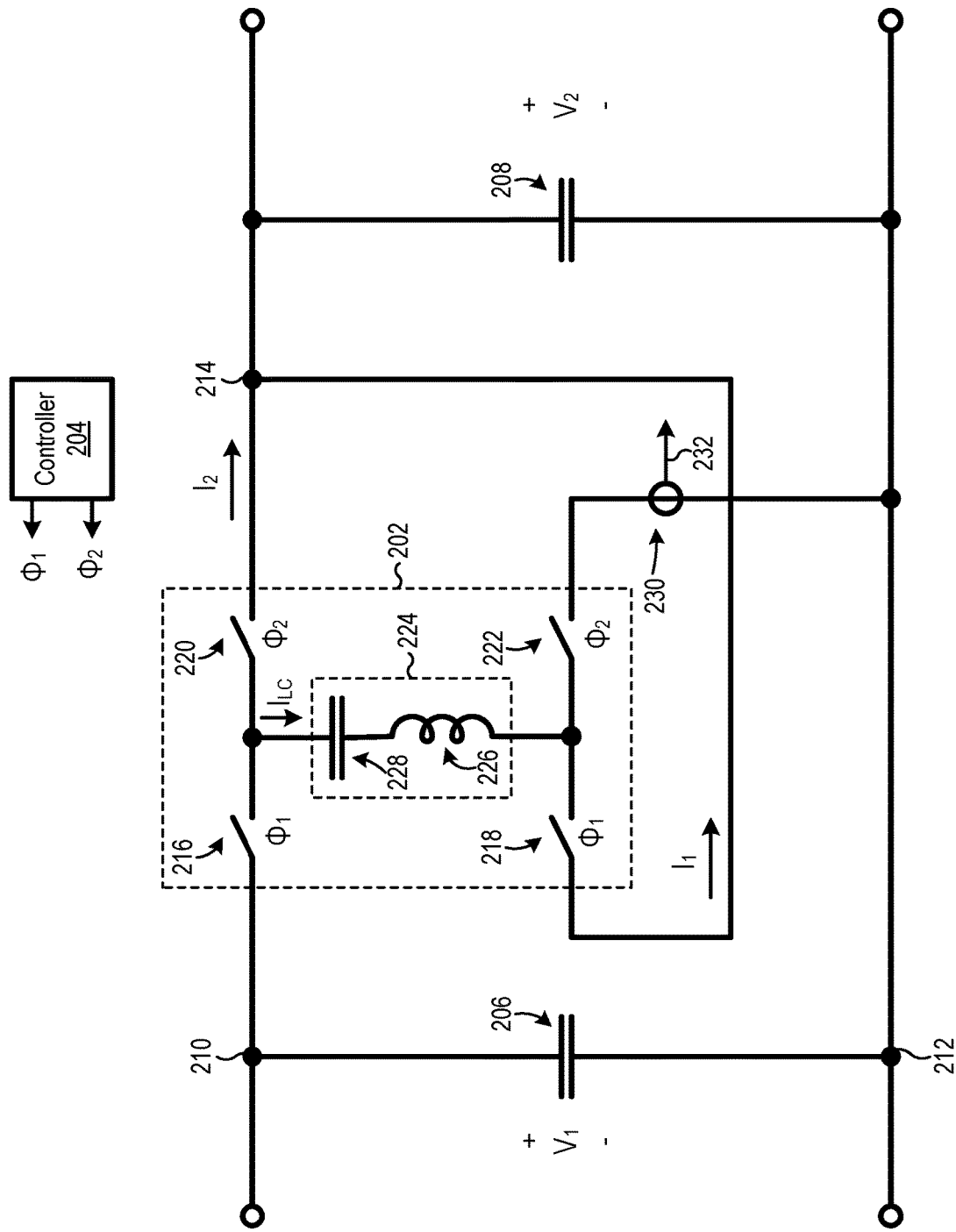
FIG. 2 is a schematic diagram illustrating a variable switching frequency STC, according to an embodiment.

FIG. 2 is a schematic diagram illustrating a variable switching frequency STC 200, which is one embodiment of the new variable frequency STCs developed by Applicant. STC 200 includes a switching stage 202 and a controller 204, and STC 200 optionally further includes a first capacitor 206 and a second capacitor 208. First capacitor 206 is electrically coupled between a first power node 210 and a reference node 212, and second capacitor 208 is electrically coupled between a second power node 214 and reference node 212. First capacitor 206 and second capacitor 208, for example, provide a path for ripple current generated by switching stage 202.

A voltage $V_1$ is present between first power node 210 and reference node 212 during operation of STC 200, and a voltage $V_2$ is present between second power node 214 and reference node 212 during operation of STC 200. A ratio of voltage $V_2$ to voltage $V_1$ is approximately 0.5 during operation of STC 200. In one application of STC 200 illustrated in FIG. 3, first power node 210 and reference node 212 are connected to an electric power source 302 to power STC 200, and second power node 214 and reference node 212 are connected to a load 304 that is powered by STC 200, such that STC 200 operates as a step-down converter where magnitude of voltage $V_2$ is approximately 50 percent of magnitude of voltage $V_1$. In this application, voltage $V_1$ is an input voltage of STC 200, and voltage $V_2$ is an output voltage of STC 200. In another application of STC 200 illustrated in FIG. 4, second power node 214 and reference node 212 are connected to an electric power source 402 to power STC 200, and first power node 210 and reference node 212 are connected to a load 404 that is powered by STC 200, such that STC 200 operates as a step-up converter where magnitude of voltage $V_1$ is approximately twice magnitude of voltage $V_2$. In this application, voltage $V_1$ is an output voltage of STC 200, and voltage $V_2$ is an input voltage of STC 200.

Referring again to FIG. 2, switching stage 202 includes a first switching device 216, a second switching device 218, a third switching device 220, a fourth switching device 222, and a resonant tank circuit 224. In certain embodiments, each of first, second, third and fourth switching devices 216, 218, 220, and 222 includes one or more transistors, e.g., a metal oxide semiconductor field-effect transistor (MOSFET) or a bipolar junction transistors (BJT), configured to operate as a switch. First switching device 216 and second switching device 218 collectively form a first pair of switching devices configured to drive resonant tank circuit 224. First switching device 216 is electrically coupled between first power node 210 and resonant tank circuit 224, and second switching device 218 is electrically coupled between resonant tank circuit 224 and second power node 214. Consequently, resonant tank circuit 224 is electrically coupled between first switching device 216 and second switching device 218, and first switching device 216 and second switching device 218 are each electrically coupled in series with resonant tank circuit 224. Resonant tank circuit 224 includes an inductor 226 and a capacitor 228 electrically coupled in series with each other. Each of first switching device 216 and second switching device 218 is controlled by a first control signal $\phi_1$ generated by controller 204. Specifically, each of first switching device 216 and second switching device 218 operates in its closed or "on" state when first control signal $\phi_1$ is asserted, and each of first switching device 216 and second switching device 218 operates in its open or "off" state when first control signal $\phi_1$ is de-asserted.

Third switching device 220 and fourth switching device 222 collectively form a second pair of switching devices configured to drive resonant tank circuit 224. Third switching device 220 is electrically coupled between resonant tank circuit 224 and second power node 214, and fourth switching device 222 is electrically coupled between resonant tank circuit 224 and reference node 212. Consequently, resonant tank circuit 224 is electrically coupled between third switching device 220 and fourth switching device 222, and third switching device 220 and fourth switching device 222 are each electrically coupled in series with resonant tank circuit 224. Each of third switching device 220 and fourth switching device 222 is controlled by a second control signal $\phi_2$ generated by controller 204. Specifically, each of third switching device 220 and fourth switching device 222 operates in its closed or "on" state when second control signal $\phi_2$ is asserted, and each of third switching device 220 and fourth switching device 222 operates in its open or "off" state when second control signal $\phi_2$ is de-asserted. Connections between controller 204 and switching stage 202 are not shown in FIG. 2 to promote illustrative clarity.

Controller 204 is formed, for example, of analog electronic circuitry and/or digital electronic circuitry. In some embodiments, controller 204 includes a processor configured to execute instructions stored in a memory to perform one or more functions of controller 204. Although controller 204 is illustrated as being a discrete element, controller 204 may be combined with one or more elements without departing from the scope hereof.

STC 200 optionally further includes current sensing circuitry configured to determine magnitude of current flowing through the STC. For example, FIG. 2 illustrates STC 200 including optional current sensing circuitry 230 configured to generate a current sense signal 232 representing magnitude of current $I_2$ through the second pair of switching devices (third switching device 220 and fourth switching device 222). The configuration of optional current sensing circuity 230 could be modified without departing from the scope hereof. For example, in an alternate embodiment, current sensing circuitry 230 is configured to generate current sense signal 232 representing magnitude of current $I_1$ through the first pair of switching devices (first switching device 216 and second switching device 218). As another example, in another alternate embodiment, current sensing circuitry 230 is configured to generate two current sense signals representing magnitude of current $I_1$ and magnitude of current $I_2$, respectively.

Controller 204 is configured to generate first control signal $\phi_1$ and second control signal $\phi_2$ to control STC 200 such that the first pair of switching devices (first and second switching devices 216 and 218) and the second pair of switching devices (third and fourth switching devices 220 and 222) alternately drive resonant tank circuit 224. In certain embodiments, controller 204 is configured to generate first control signal $\phi_1$ and second control signal $\phi_2$ such that each of first, second, third, and fourth switching devices 216, 218, 220, and 222 switches between its open and closed state, to switch voltage across resonant tank circuit 224, when current $I_{LC}$ through resonant tank circuit 224 drops to zero, or to near zero. For example, in particular embodiments, controller 204 monitors magnitude of current $I_{LC}$ through resonant tank circuit 224 and institutes switching of the first pair of switches device or the second pair of switching devices in response to magnitude of current $I_{LC}$ dropping to zero. Additionally, controller 204 is configured to generate first control signal $\phi_1$ and second control signal $\phi_2$ such that STC 200 has a variable switching frequency, where switching frequency is greater at large load magnitudes than at light load magnitudes to promote light-load efficiency.

Figure 4:
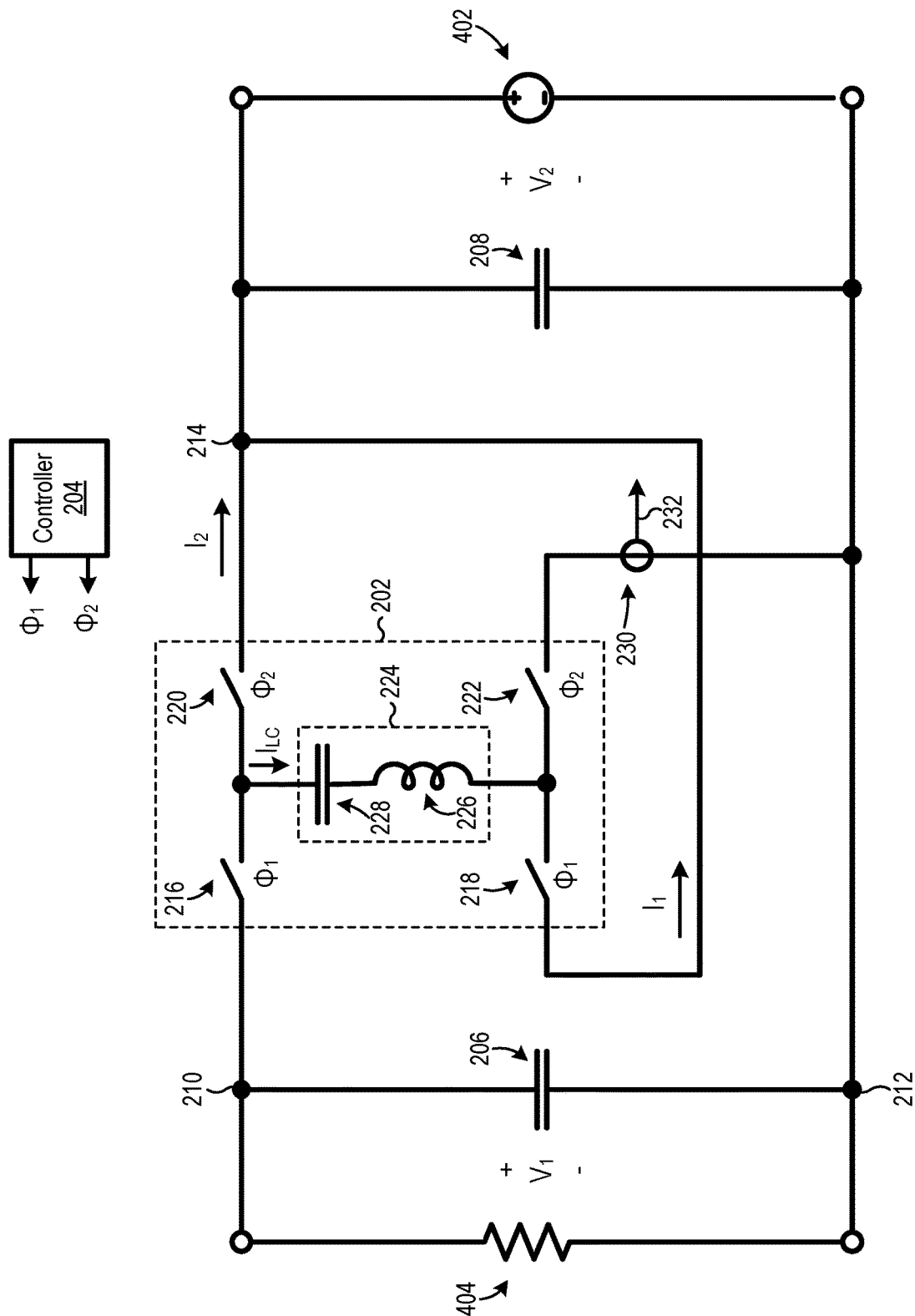
FIG. 4 is a schematic diagram illustrating one example application of the FIG. 2 STC operating as a step-up converter.
Figure 5:
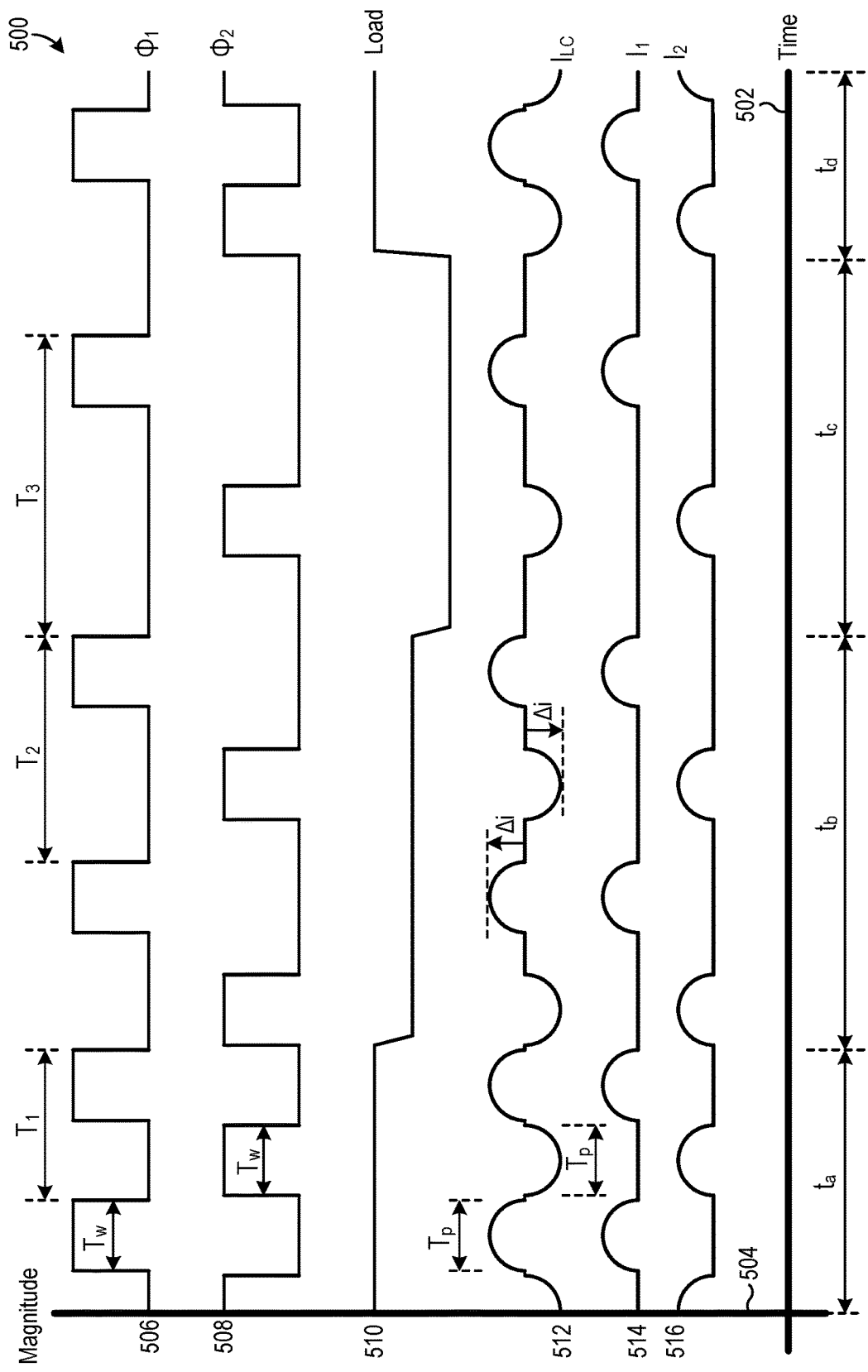
FIG. 5 is a graph illustrating one example of operation of the FIG. 2 STC as load magnitude varies, according to an embodiment.

For example, FIG. 5 is a graph 500 illustrating one example of operation of STC 200 as load magnitude varies. Graph 500 includes a horizontal axis 502 representing time, a vertical axis 504 representing magnitude, and curves 506-516. Curves 506 and 508 represent first control signal $\phi_1$ and second control signal $\phi_2$, respectively. In the example of FIG. 5, each of first control signal $\phi_1$ and second control signal $\phi_2$ is asserted when in a logic-high state, although STC 200 is not limited to this polarity of control signals $\phi_1$ and $\phi_2$. Curve 510 represents magnitude of load powered by STC 200, e.g., magnitude of load 304 in FIG. 3 or magnitude of load 404 in FIG. 4. Curve 512 represent magnitude of current $I_{LC}$ through resonant tank circuit 224, and curve 514 represents magnitude of current $I_1$ through the first pair of switching devices (first switching device 216 and second switching device 218). Curve 516 represent magnitude of current $I_2$ through the second pair of switching devices (third switching device 220 and fourth switching device 222).

As can be seen in graph 500, controller 204 generates first control signal $\phi_1$ and second control signal $\phi_2$ such that the two control signals are asserted in an alternating manner. Stated differently, first control signal $\phi_1$ is asserted, second control signal $\phi_2$ is next asserted, first control signal $\phi_1$ is next asserted, and so on. Each of first control signal $\phi_1$ and second control signal $\phi_2$ is asserted for a duration $T_w$. Consequently, each pulse of current $I_{LC}$ through resonant tank circuit 224 has an uniform duration $T_p$, where current pulse duration $T_p$ is a function of control signal duration $T_w$. In certain embodiments, controller 204 is configured to have a control signal duration $t_w$ which results in current pulse duration $T_p$ being equal to a resonant half-period of resonant tank circuit 224, to achieve zero-current switching where first control signal $\phi_1$ and second control signal $\phi_2$ change respective states when magnitude of current $I_{LC}$ through resonant tank circuit 224 is at zero or at near zero.

Graph 500 illustrates an example of operation of STC 200 during time periods $t_a$, $t_b$, $t_c$, and $t_d$. Magnitude of the load powered by STC 200 is relatively large during time period $t_a$. Consequently, controller 204 generates first control signal $\phi_1$ and second control signal $\phi_2$ such that the two control signals are almost complementary, i.e., one control signal is asserted when the other control signal is de-asserted, and vice versa. However, there is a small deadtime between when first control signal $\phi_1$ is de-asserted and second control signal $\phi_2$ is asserted, and vice versa, to prevent simultaneous conduction of the first pair of switching devices and the second pair of switching devices. This deadtime is evident from inspection of curve 512 showing that magnitude of $I_{LC}$ through resonant tank circuit 224 drops to zero after each switching transition. STC 200 has a switching frequency $F_1$ during time period $t_a$, where switching frequency $F_1$ is the inverse of switching period $T_1$ during time period $t_a$. First control signal $\phi_1$ and second control signal $\phi_2$ collectively control switching stage 202 to drive resonant tank circuit 224 at switching frequency $F_1$ during time period $t_a$. In particular, first switching device 216 and second switching device 218 are closed when first control signal $\phi_1$ is asserted to drive resonant tank circuit 224 with a first polarity, and third switching device 220 and fourth switching device 222 are closed when second control signal $\phi_2$ is asserted to drive resonant tank circuit 224 at a second polarity opposite of the first polarity. Accordingly, resonant tank circuit 224 is alternately driven at the first and second polarities at switching frequency $F_1$ during time period $t_a$.

Magnitude of load powered by STC 200 is smaller in time period $t_b$ than in time period $t_a$. Consequently, controller 204 generates first control signal $\phi_1$ and second control signal $\phi_2$ such that a switching frequency $F_2$ of STC 200 during time period $t_b$ is smaller than switching frequency $F_1$ of STC 200 during time period $t_a$, where switching frequency $F_2$ is the inverse of switching period $T_2$ during time period $t_b$. First control signal $\phi_1$ and second control signal $\phi_2$ collectively control switching stage 202 to drive resonant tank circuit 224 at switching frequency $F_2$ during time period $t_b$. In particular, first switching device 216 and second switching device 218 are closed when first control signal $\phi_1$ is asserted to drive resonant tank circuit 224 with a first polarity, and third switching device 220 and fourth switching device 222 are closed when second control signal $\phi_2$ is asserted to drive resonant tank circuit 224 at a second polarity opposite of the first polarity, during time period $t_b$. Accordingly, resonant tank circuit 224 is alternately driven at the first and second polarities at switching frequency $F_2$ during time period $t_b$.

Magnitude of load powered by STC 200 is smaller in time period $t_c$ than in each of time periods $t_a$ and $t_b$. Consequently, controller 204 generates first control signal $\phi_1$ and second control signal $\phi_2$ such that a switching frequency $F_3$ of STC 200 during time period $t_c$ is smaller than each of switching frequencies $F_1$ and $F_2$ of STC 200 during time periods $t_a$ and $t_b$, respectively, where switching frequency $F_3$ is the inverse of switching period $T_3$ during time period $t_c$. First control signal $\phi_1$ and second control signal $\phi_2$ collectively control switching stage 202 to drive resonant tank circuit 224 at switching frequency $F_3$ during time period $t_c$. In particular, first switching device 216 and second switching device 218 are closed when first control signal $\phi_1$ is asserted to drive resonant tank circuit 224 with a first polarity, and third switching device 220 and fourth switching device 222 are closed when second control signal $\phi_2$ is asserted to drive resonant tank circuit 224 at a second polarity opposite of the first polarity, during time period $t_c$. Accordingly, resonant tank circuit 224 is alternately driven at the first and second polarities at switching frequency $F_3$ during time period $t_c$.

Magnitude of load powered by STC 200 in time period $t_d$ is the same as magnitude of load powered by STC 200 in time period $t_a$. Consequently, switching frequency of STC 200 in time period $t_d$ is the same as switching frequency of STC 200 in time period $t_a$, i.e., switching frequency of STC 200 in time period $t_d$ is equal to switching frequency $F_1$.

The reduction in switching frequency of STC 200 during time periods $t_b$ and $t_c$ reduces switching losses of STC 200 during these time periods, thereby promoting light load efficiency. As a result, in some embodiments, efficiency of STC 200 does not materially decrease as load magnitude decreases from a value where switching losses are equal to conduction losses.

Additionally, the reduction in switching frequency of STC 200 during time periods $t_b$ and $t_c$ may improve transient response of STC 200 during these time periods. To help understand this advantage of STC 200, first consider a conventional STC, where resonant tank circuit peak current is linearly related to load current, due to the conventional STC operating at a fixed frequency. Resonant tank circuit peak current in a conventional STC drops to zero when the STC is unloaded, thereby requiring significant time for current through the resonant tank circuit to ramp up in response to a load magnitude increase. Therefore, a conventional STC may suffer from significant output voltage undershoot when powering a step load starting from near zero.

In contrast, in certain embodiments of STC 200, reduction in switching frequency at light load magnitude enables peak current magnitude through the resonant tank circuit to remain at a relatively large value at light load. As a result, STC 200 may be capable of responding relatively quickly to a step load starting from near zero, thereby promoting fast transient response and helping minimize output voltage undershoot.

In some embodiments, controller 204 is configured to generate first control signal $\phi_1$ and second control signal $\phi_2$ to achieve a switching frequency such that each pulse of current $I_{LC}$ through resonant tank circuit 204 has a predetermined magnitude that does not change as switching frequency of STC 200 decreases. For example, FIG. 5 illustrates each pulse of current $I_{LC}$ through resonant tank circuit 204 having a predetermined magnitude $\Delta i$ during each of time periods $t_a$, $t_b$, $t_c$, and $t_d$. Maintaining pulses of current $I_{LC}$ at a constant magnitude as switching frequency decrease helps prevent efficiency of STC 200 from decreasing as magnitude of load powered by STC 200 decreases.

In some embodiments, controller 204 is configured to directly control switching frequency of STC 200 as a function of magnitude load powered by STC 200, such as by determining magnitude of the load and decreasing magnitude of the switching frequency as the load magnitude decreases. In some other embodiments, controller 204 is configured to indirectly control switching frequency of STC 200 as a function of magnitude load powered by STC 200. For example, in some embodiments, controller 204 is configured to determine magnitude of current flowing through STC 200 and control switching frequency of STC 200 at least partially in proportion to the magnitude of current. In these embodiments, the magnitude of current flowing through STC 200 represents magnitude of the load powered by the STC. In particular embodiments, controller 204 determines one or more magnitude of current $I_1$ through the first pair of switching devices and magnitude of current $I_2$ through the second pair of switching devices to determine magnitude of current flowing through STC 200.

Figure 3:
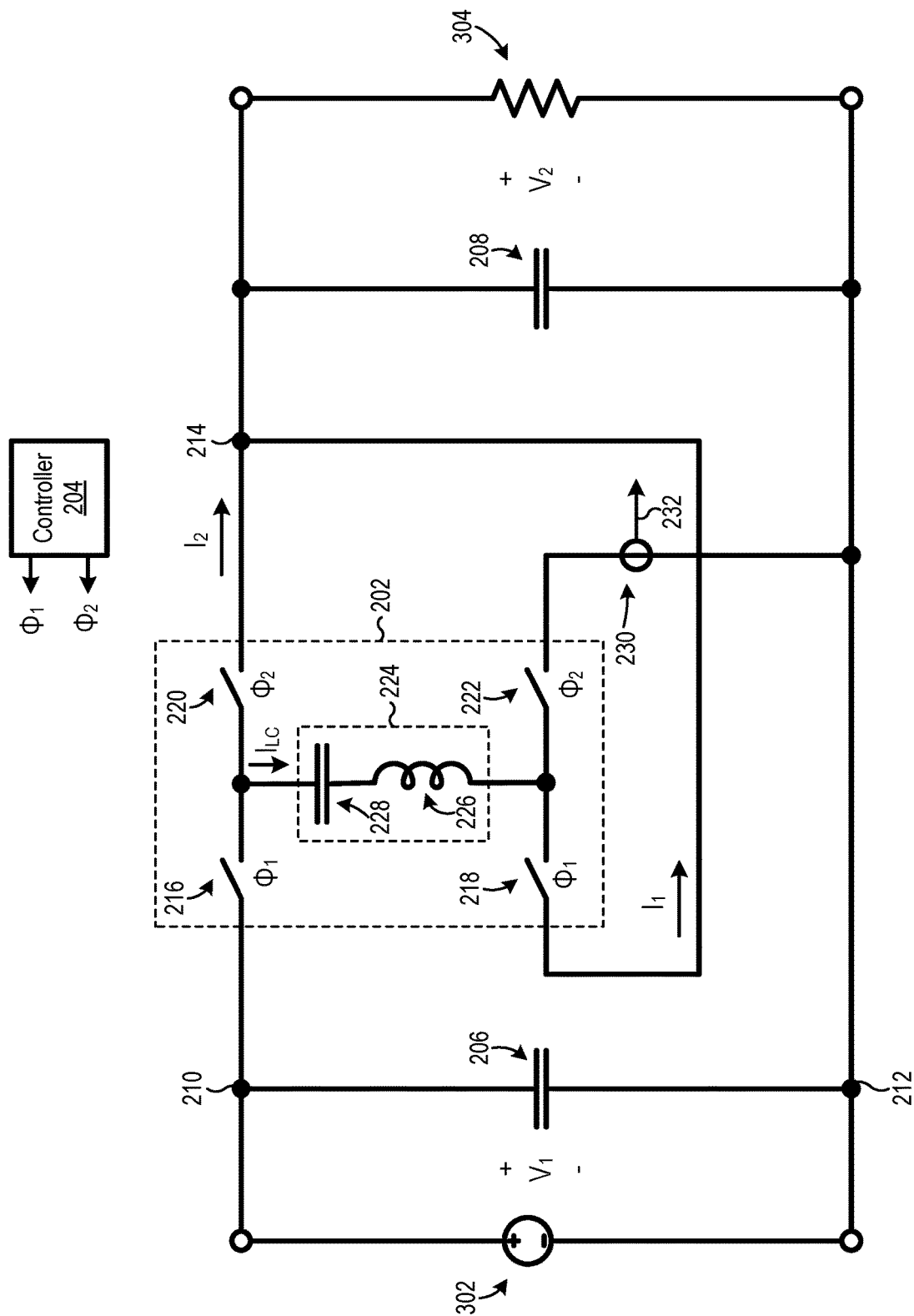
FIG. 3 is a schematic diagram illustrating one example application of the FIG. 2 STC operating as a step-down converter.

Output voltage of STC 200, e.g., voltage $V_2$ in FIG. 3 or voltage $V_1$ in FIG. 4, can also represent magnitude of the load powered by STC 200 because output voltage will typically decrease with increasing load magnitude due to conduction losses in STC 200. Accordingly, in some embodiments, controller 204 is configured to control switching frequency of STC 200 in inverse proportion to magnitude of output voltage, or in response to magnitude of output voltage crossing a threshold value.

In some applications of STC 200, it may be desirable to prevent switching frequency of STC 200 from falling below a minimum value, such as to help ensure electromagnetic compatibility of STC 200 with other devices. Accordingly, in some embodiments, controller 200 is configured to prevent switching frequency of STC 200 from falling below a predetermined threshold value which represents a minimum acceptable switching frequency of STC 200.

Figure 6:
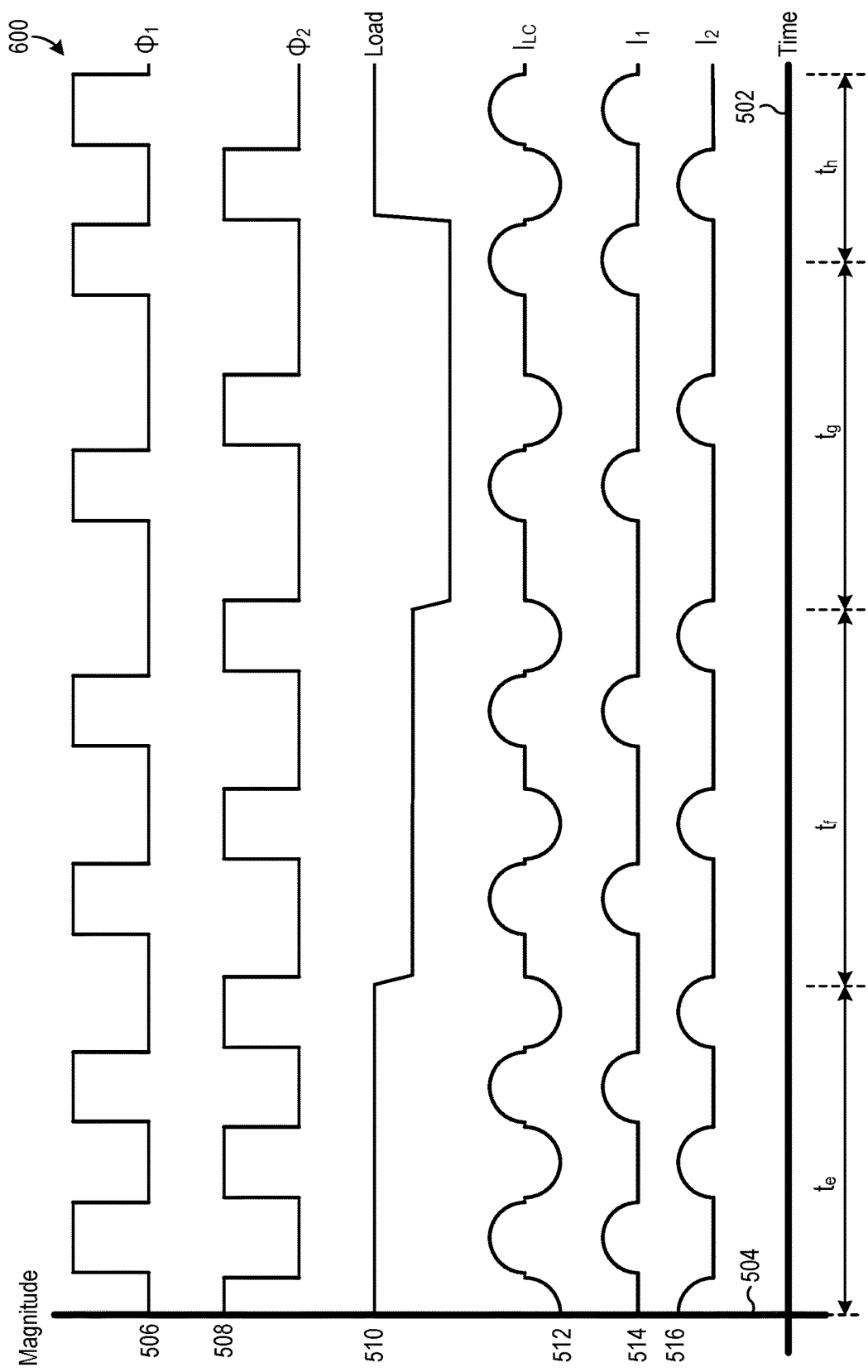
FIG. 6 is a graph illustrating another example of operation of the FIG. 2 STC as load magnitude varies, according to an embodiment.

In the example of FIG. 5, controller 204 generates first control signal $\phi_1$ and second control signal $\phi_2$ such that the two control signals are asserted 180 degrees out of phase with each other irrespective of switching frequency of STC 200. However, controller 204 is not limited to this configuration. For example, FIG. 6 is a graph 600 illustrating another example of operation of STC 200 as load magnitude varies. Graph 600 includes the same curves as graph 500 of FIG. 5. The example illustrated in FIG. 6 is similar to the example illustrated in FIG. 5 except that controller 204 is configured such that first control signal $\phi_1$ and second control signal $\phi_2$ are asserted 120 degrees out of phase with each other during time periods $t_f$ and $t_g$ where magnitude of load powered by STC 200 is relatively small. During time periods $t_e$ and $t_h$ where magnitude of load powered by STC 200 is relatively large, first control signal $\phi_1$ and second control signal $\phi_2$ are asserted 180 degrees out of phase with each other.

Discussed below with respect to FIGS. 7-12 are several possible implementations of controller 204. It should be appreciated, however, that controller 204 is not limited to the implementations of these figures.

Figure 7:
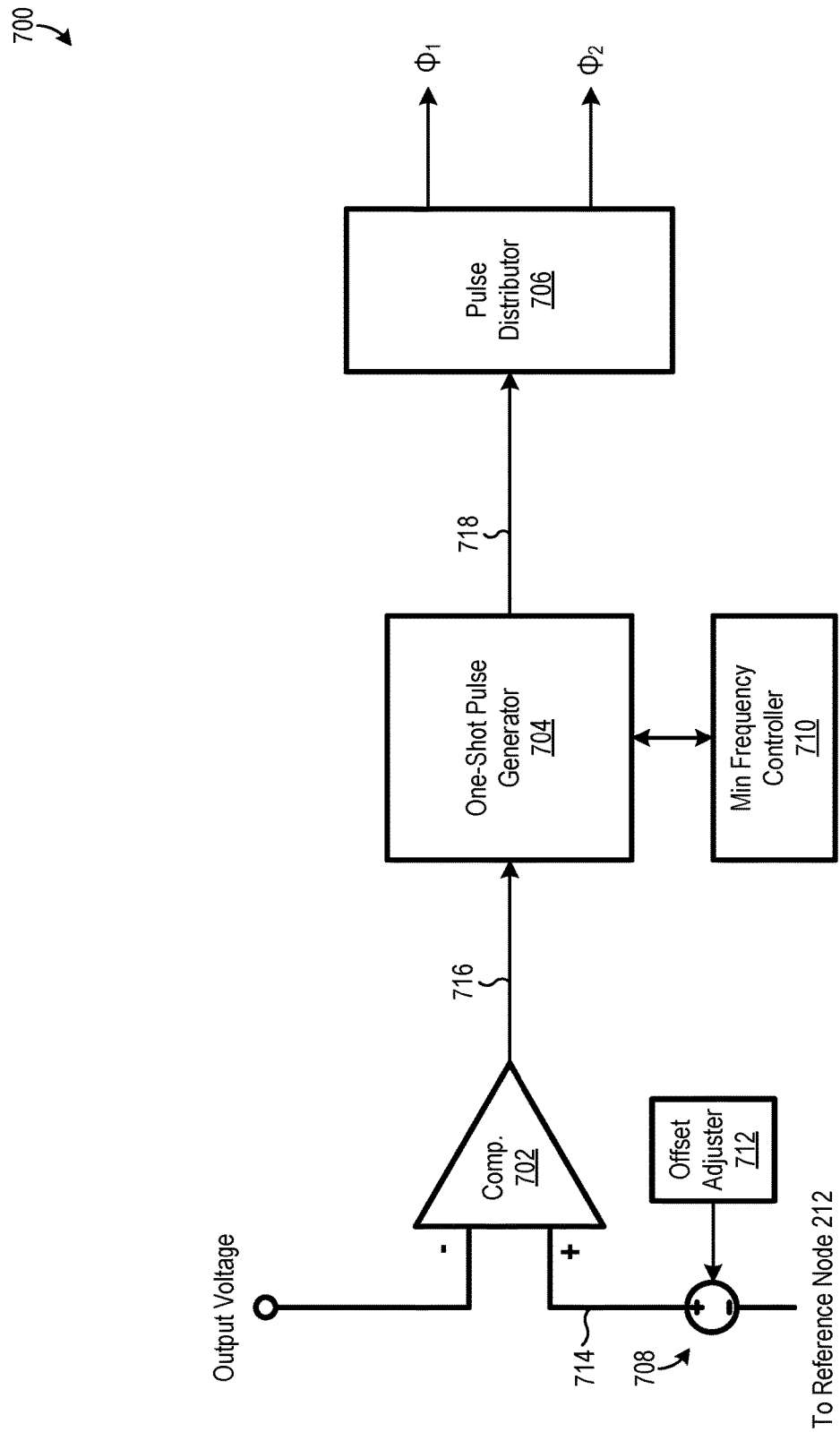
FIG. 7 is a schematic diagram illustrating one embodiment of a controller of the FIG. 2 STC.

FIG. 7 is a schematic diagram illustrating a controller 700. Controller 700 is one embodiment of controller 204, and certain embodiments of controller 700 are capable of controlling STC 200 in a manner like that illustrated in graph 500 (FIG. 5). Controller 700 includes a comparator 702, a one-shot pulse generator 704, a pulse distributor 706, and a threshold voltage source 708. Controller 700 optionally further includes a minimum frequency controller 710 and an offset adjuster 712. Although FIG. 7 illustrates each of comparator 702, one-shot pulse generator 704, pulse distributor 706, threshold voltage source 708, minimum frequency controller 710, and offset adjuster 712 as being separate elements, two or more of these elements may be combined without departing from the scope hereof. Controller 700 is implemented, for example, by analog circuitry and/or digital circuitry. In some embodiments, controller 700 includes a processor executing instructions stored in a memory to perform one or more of the functions of controller 700.

An inverting input of comparator 702 is configured to receive an output voltage of STC 200, e.g., voltage at second power node 214 in FIG. 3 or voltage at first power node 210 in FIG. 4. A non-inverting input of comparator 702 is configured to receive a first threshold value 714 generated by threshold voltage source 708. In certain embodiments, threshold voltage source 708 is configured to generate first threshold value 714 such that first threshold value 714 is determined as follows:

$$\text{First Threshold Value } 714 = K * V_{in} - V_{off} \quad \text{(EQN. 1)}$$

In EQN. 1 above, K is a transfer function of STC 200, which depends on the application of STC 200. For example, in the application of FIG. 3, K is equal to 0.5 because a ratio of output voltage ($V_2$) to input voltage ($V_1$) is 0.5. As another example, in the application of FIG. 4, K is equal to 2.0 because ratio of output voltage ($V_1$) to input voltage ($V_2$) is 2.0. $V_{in}$ is input voltage of STC 200, e.g., $V_1$ in FIG. 3 or $V_2$ in FIG. 4. $V_{off}$ is an offset which is selected, for example, to achieve a desired magnitude of pulses of current $I_{LC}$ through resonant tank circuit 204. In embodiments including optional offset adjuster 712, offset adjuster 712 is configured to adjust magnitude of $V_{off}$, as discussed below.

Comparator 702 generates a trigger signal 716 in response to the output voltage crossing, i.e., dropping below, first threshold value 714. One-shot pulse generator 704 generates a pulse signal 718 of a predetermined duration in response to trigger signal 716. One-shot pulse generator 704 is configured, for example, such that pulse signal 718 has a predetermined duration resulting in current pulse duration $T_p$ (FIG. 5) being equal to a resonant half-period of resonant tank circuit 224.

In some embodiments, one-shot pulse generator 704 is further configured to generate a pulse 718 in response to trigger signal 716 not being asserted for a predetermined amount of time, thereby causing controller 700 to initiate driving of resonant tank circuit 204 in response to the output voltage of STC 200 not crossing first threshold value 714 for the predetermined amount of time. One-shot pulse generator 704 is further configured to provide a predetermined delay between successive pulse signals 718 under this condition. This configuration advantageously promotes a smooth transition between variable switching frequency operation and fixed switching frequency operation of STC 200.

Pulse distributor 706 generates first control signal $\phi_1$ and second control signal $\phi_2$ in response to pulse signal 718. In particular, pulse distributor 706 asserts first control signal φ₁ and second control signal φ₂ in an alternating manner in response to receipt of pulse signal 718.

In embodiments including minimum frequency controller 710, minimum frequency controller 710 cooperates with one-shot pulse generator 704 to prevent the switching frequency of STC 200 from falling below a predetermined second threshold value. In particular, if comparator 706 does not generate trigger signal 716 at a sufficient rate to prevent the switching frequency from falling below the predetermined second threshold value, minimum frequency controller 710 causes one-shot pulse generator 704 to generate pulse signal 718 at a rate which maintains minimum switching frequency at the predetermined second threshold value.

Magnitude of each pulse of current $I_{LC}$ through resonant tank circuit 204 is determined by magnitude of $V_{off}$. For example, each pulse of current $I_{LC}$ increases with increasing magnitude of $V_{off}$. Consequently, in some embodiments including optional offset adjuster 712, offset adjuster 712 is configured to adjust magnitude of $V_{off}$ such that each pulse of current through resonant tank circuit 224 has a predetermined magnitude, such as to help maintain efficiency of STC 200 as magnitude of load powered by STC 200 decreases.

In some applications of STC 200, a load powered by STC 200 may be negative at times, such that the load acts a power source instead of a power sink. A negative load may cause an undesired output voltage rise in STC 200 when STC 200 has a low switching frequency. Accordingly, in some embodiments, controller 204 is configured to increase switching frequency in response to a change in polarity of the load powered by STC 200, e.g., in response to the polarity of the load changing from positive to negative.

Figure 8:
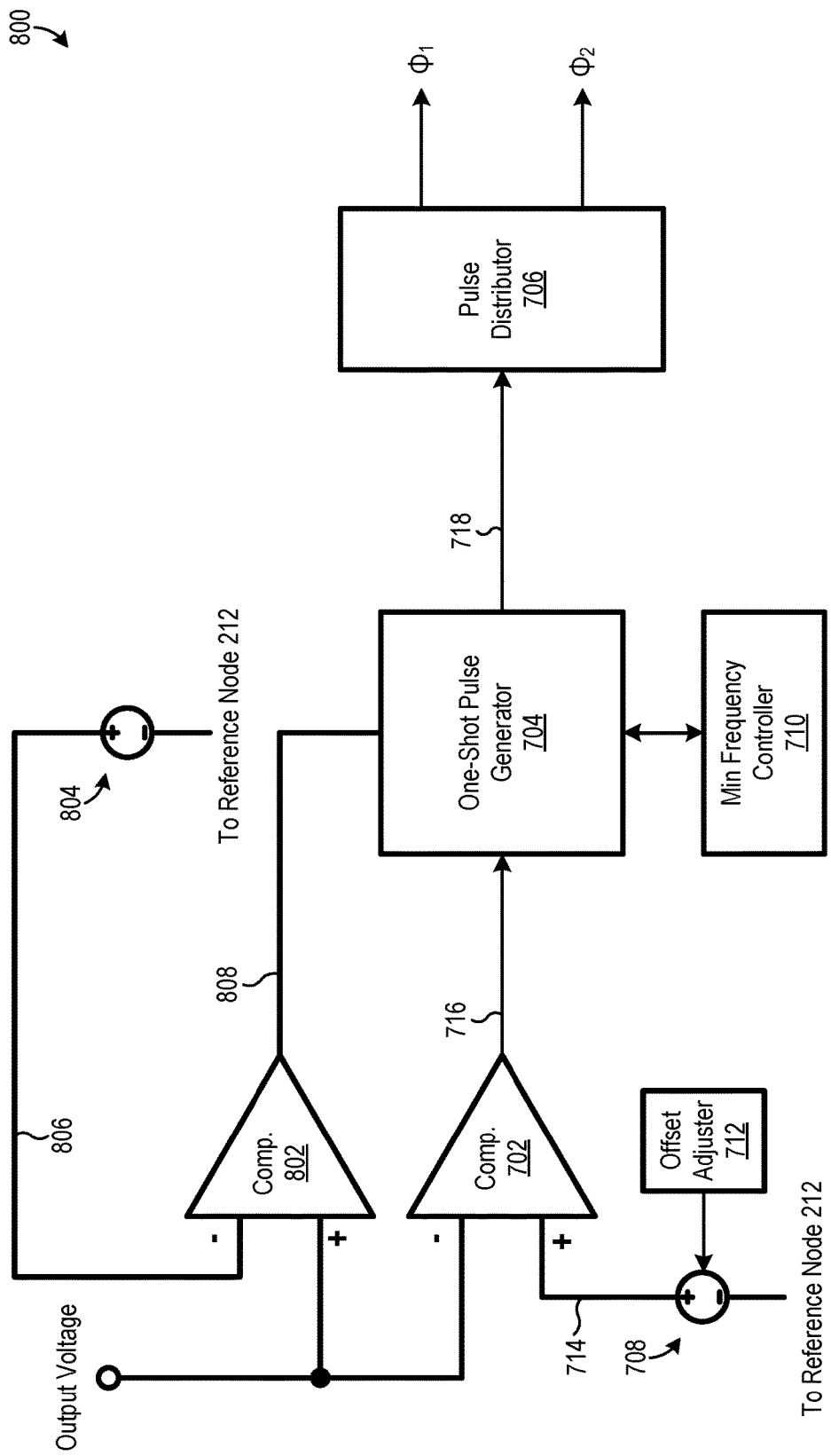
FIG. 8 is a schematic diagram illustrating another embodiment of a controller of the FIG. 2 STC.

For example, FIG. 8 is a schematic diagram illustrating a controller 800 which is capable of increasing switching frequency in response to a negative load on STC 200. Controller 800 is an embodiment of controller 204, and controller 800 is similar to controller 700 except that controller 800 further includes a second comparator 802 and a second threshold voltage source 804. Although FIG. 8 illustrates each of comparator 702, one-shot pulse generator 704, pulse distributor 706, threshold voltage source 708, minimum frequency controller 710, offset adjuster 712, second comparator 802, and second threshold voltage source 804 as being separate elements, two or more of these elements may be combined without departing from the scope hereof. Controller 800 is implemented, for example, by analog circuitry and/or digital circuitry. In some embodiments, controller 800 includes a processor executing instructions stored in a memory to perform one or more of the functions of controller 800.

A non-inverting input of comparator 802 is configured to receive an output voltage of STC 200, e.g., voltage at second power node 214 in FIG. 3 or voltage at first power node 210 in FIG. 4. An inverting input of comparator 802 is configured to receive a second threshold value 806 generated by second threshold voltage source 804. In certain embodiments, second threshold voltage source 804 is configured to generate second threshold value 806 such that second threshold value 806 is determined as follows:

$$\text{Second Threshold Value 806} = K * V_{in} + V_{off2} \quad \text{(EQN. 2)}$$

In EQN. 2 above, K and Vin are the same as in EQN. 1. $V_{off2}$ an is an offset which is chosen, for example, to achieve a desired magnitude of pulses of current $I_{LC}$ through resonant tank circuit 204. In some embodiments, $V_{off2}$ is the same as $V_{off1}$ of EQN. 1.

Comparator 802 generates a trigger signal 808 in response to the output voltage crossing, i.e., rising above, second threshold value 806. One-shot pulse generator 704 generates a pulse signal 718 of a predetermined duration in response to either trigger signal 716 or trigger signal 808. One-shot pulse generator 704 and pulse distributor 706 operate in the same manner as discussed above with respect to FIG. 7.

Figure 9:
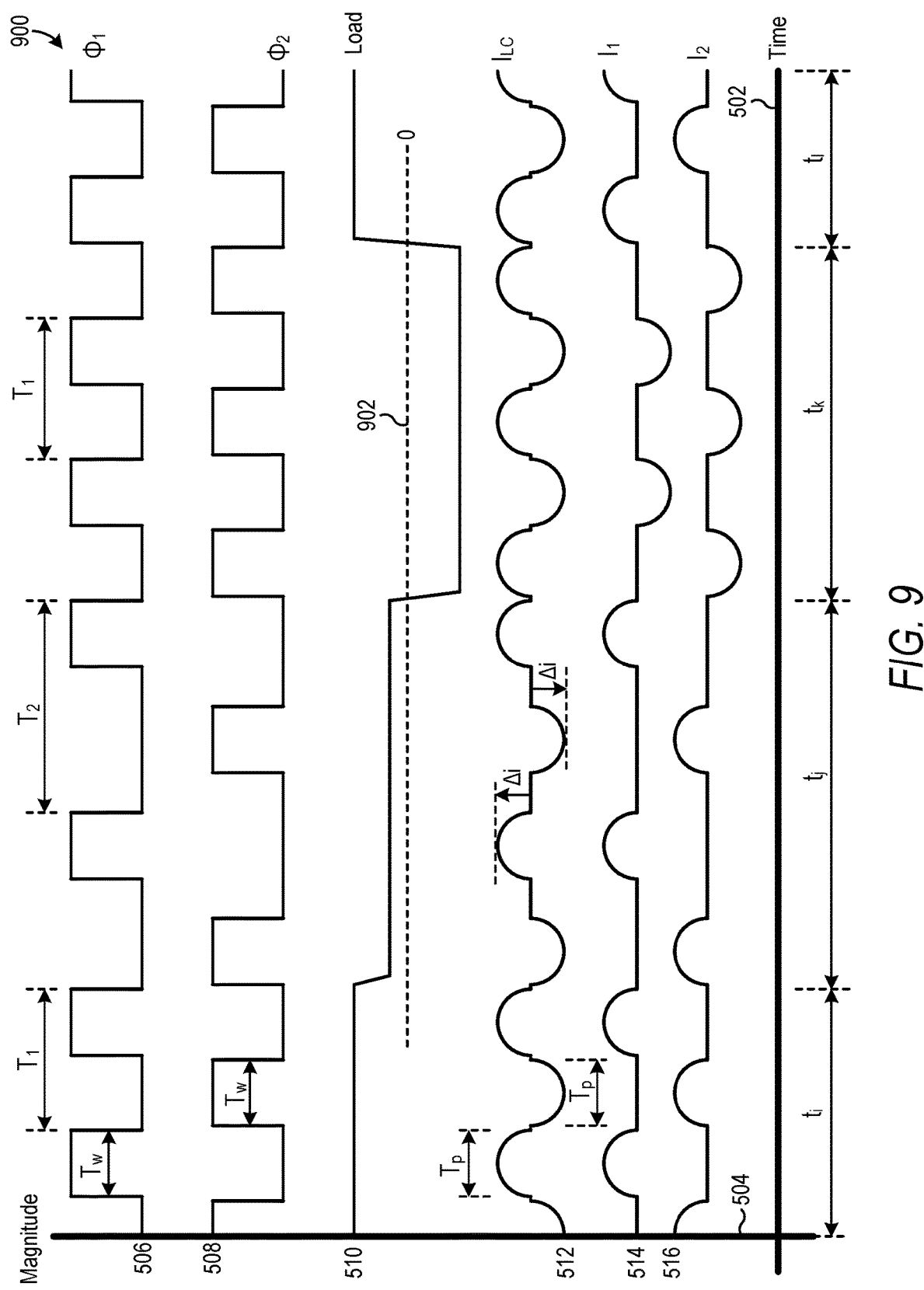
FIG. 9 is a graph illustrating one example of operation of the FIG. 2 STC when using the FIG. 8 controller, according to an embodiment.

FIG. 9 is a graph 900 illustrating one example of operation of STC 200 as load magnitude varies when controller 204 is embodied as controller 800 of FIG. 8. Graph 900 includes the same curves as graph 500 of FIG. 5. Graph 900 illustrates an example of operation of STC 200 during time periods $t_i$, $t_j$, $t_k$, and $t_1$. STC 200 operates in time periods and tin the same manner that STC 200 operates in time periods $t_a$, $t_b$, and $t_d$ of FIG. 5. In time period $t_k$, however, polarity of the load powered by STC 200 changes such that magnitude of the load is negative, as shown by curve 510 being below a dashed line 902 representing zero-load. As a result, magnitude of the output voltage repeatedly rises above second threshold value 806, thereby causing comparator 802 to repeatedly generate trigger signal 808, resulting in STC 200 having a switching period $T_1$ and switching frequency $F_1$ during time period $t_k$.

Figure 10:
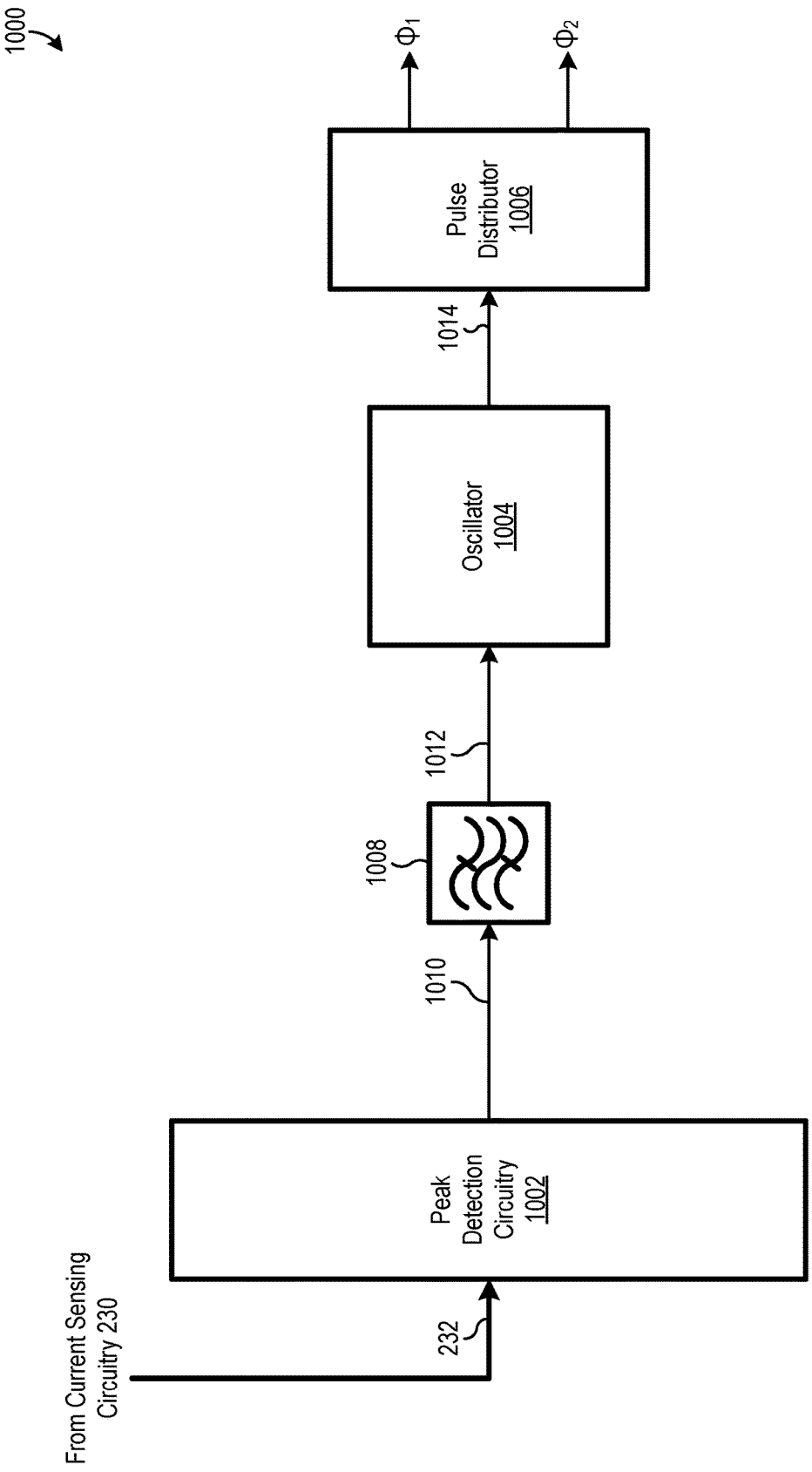
FIG. 10 is a schematic diagram illustrating another embodiment of a controller of the FIG. 2 STC.

FIG. 10 is a schematic diagram illustrating a controller 1000. Controller 1000 is another embodiment of controller 204, and certain embodiments of controller 1000 are capable of controlling STC 200 in a manner like that illustrated in graph 600 (FIG. 6). Controller 1000 includes peak detection circuitry 1002, an oscillator 1004, a pulse distributor 1006, and a low-pass filter 1008. Although FIG. 10 illustrates each of peak detection circuitry 1002, oscillator 1004, pulse distributor 1006, and low-pass filter 1008 as being separate elements, two or more of these elements may be combined without departing from the scope hereof. Controller 1000 is implemented, for example, by analog circuitry and/or digital circuitry. In some embodiments, controller 1000 includes a processor executing instructions stored in a memory to perform one or more of the functions of controller 1000.

Peak detection circuitry 1002 receives current sense signal 232 from current sensing circuitry 230, and peak detection circuitry 1002 is configured to generate an envelope signal 1010 from current sense signal 232. Envelope signal 1010 represents an envelope of the current sensed by current sensing circuitry 230, e.g., an envelope of current $I_2$ through the second pair of switching devices. Low-pass filter 1008 filters envelope signal 1010 to generate a filtered envelope signal 1012, and oscillator 1004 is configured to generate an oscillator signal 1014 having a frequency proportional to magnitude of filtered envelope signal 1012. Pulse distributor 1006 generates first control signal φ₁ and second control signal φ₂ in response to oscillator signal 1014. In particular, pulse distributor 1006 asserts first control signal φ₁ and second control signal φ₂ in an alternating manner in response to oscillator signal 1014. Accordingly, controller 1000 causes STC 200 to have a switching frequency that is proportional to an envelope of current $I_2$ through the second pair of switching devices. Controller 1000 could be modified to receive a current sense signal other than current sense signal 232, e.g., a current sense signal representing current flowing through a different portion of STC 200, without departing from the scope hereof.

Figure 11:
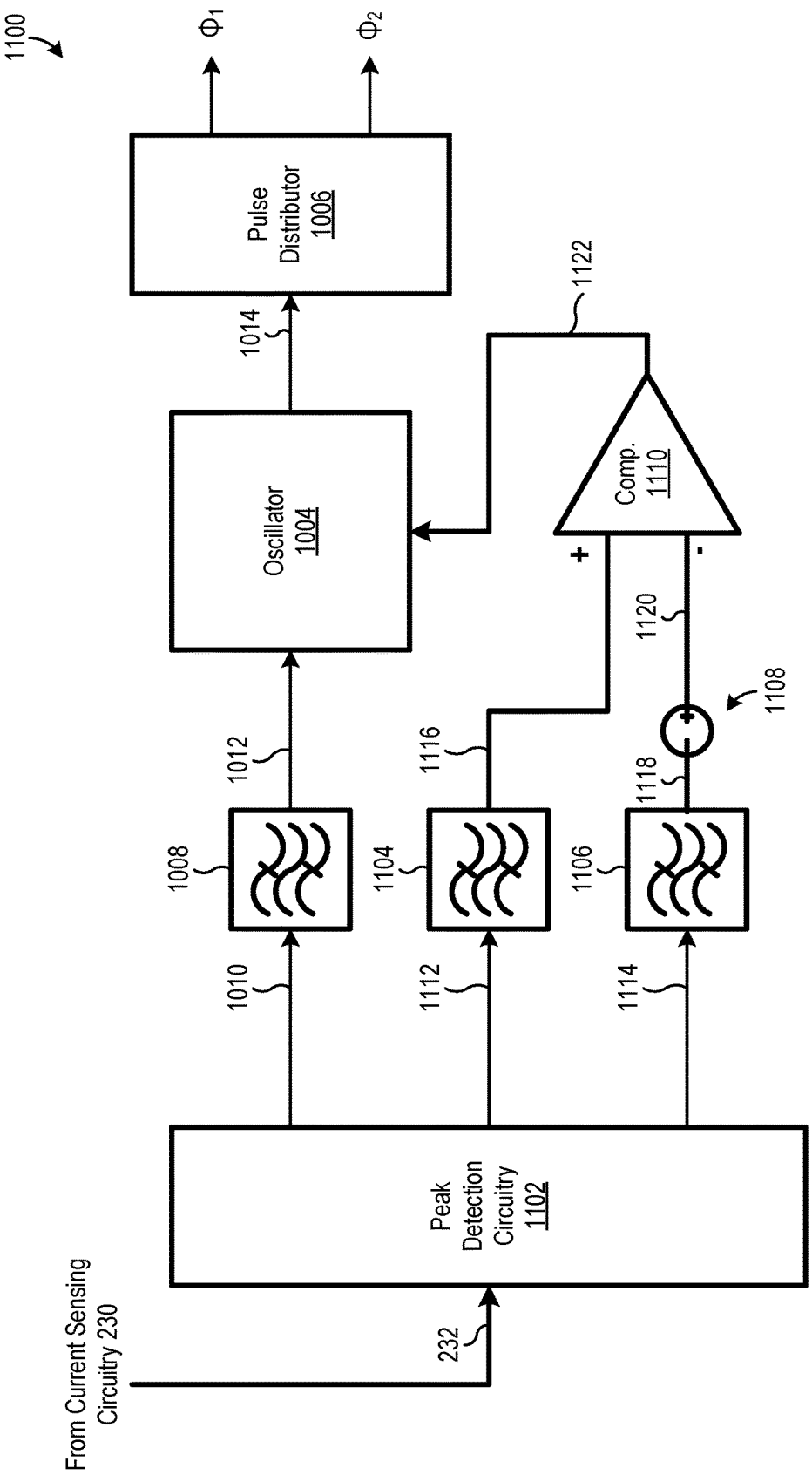
FIG. 11 is a schematic diagram illustrating a controller that is similar to the FIG. 10 controller but including additional circuitry to enable the controller to quickly increase switching frequency in response to an increase in load magnitude, according to an embodiment.

FIG. 11 is a schematic diagram illustrating a controller 1100 which is similar to controller 1000 of FIG. 10 but further including additional circuitry to enable controller 1100 to quickly increase switching frequency in response to an increase in magnitude of a load powered by STC 200. In particular, controller 1100 includes the elements of controller 1100 except that (a) controller 1100 includes peak detection circuitry 1102 in place of peak detection circuitry 1002, and (b) controller 1100 further includes a low-pass filter 1104, a low-pass filter 1106, a threshold voltage source 1108, and a comparator 1110. Although FIG. 11 illustrates each of peak detection circuitry 1102, oscillator 1004, pulse distributor 1006, low-pass filter 1008, low-pass filter 1104, low-pass filter 1106, threshold voltage source 1108, and comparator 1110 as being separate elements, two or more of these elements may be combined without departing from the scope hereof. Controller 1100 is implemented, for example, by analog circuitry and/or digital circuitry. In some embodiments, controller 1100 includes a processor executing instructions stored in a memory to perform one or more of the functions of controller 1100.

Peak detection circuitry 1102 of FIG. 11 is similar to peak detection circuitry 1002 of FIG. 10, but peak detection circuitry 1102 is further configured to generate a peak envelope signal 1112 and an average envelope signal 1114 in addition to envelope signal 1010. Peak envelope signal 1112 represents the peak of the envelope of the current sensed by current sensing circuitry 230, and average envelope signal 1114 represent the average of the envelope of the current sensed by current sensing circuitry 230. Low-pass filter 1104 filters peak envelope signal 1112 to generate a filtered peak envelope signal 1116, and low-pass filter 1106 filters average envelope signal 1114 to generate a filtered average envelope signal 1118. Filtered average envelope signal 1118 is increased by a voltage of threshold voltage source 1108 to generate a comparison signal 1120. Comparator 1110 compares filtered peak envelope signal 1116 to comparison signal 1120, and comparator 1110 asserts a current increase signal 1122 in response to magnitude of filtered peak envelope signal 1116 exceeding comparison signal 1120.

Oscillator 1004 responds to current increase signal 1122 by increasing magnitude of oscillator signal 1014, which causes switching frequency of STC 200 to increase. Accordingly, peak detection circuitry 1102, low-pass filter 1104, low-pass filter 1106, threshold voltage source 1108, and comparator 1110 enable controller 1100 to quickly increase the switching frequency of STC 200 in response to an increase in magnitude of a load powered by STC 200. Voltage of threshold voltage source 1108 determines the magnitude of load increase required for comparator 1110 to assert current increase signal 1122. In particular, sensitivity of comparator 1100 to a load increase is inversely proportional to the magnitude of voltage generated by threshold voltage source 1108.

Figure 12:
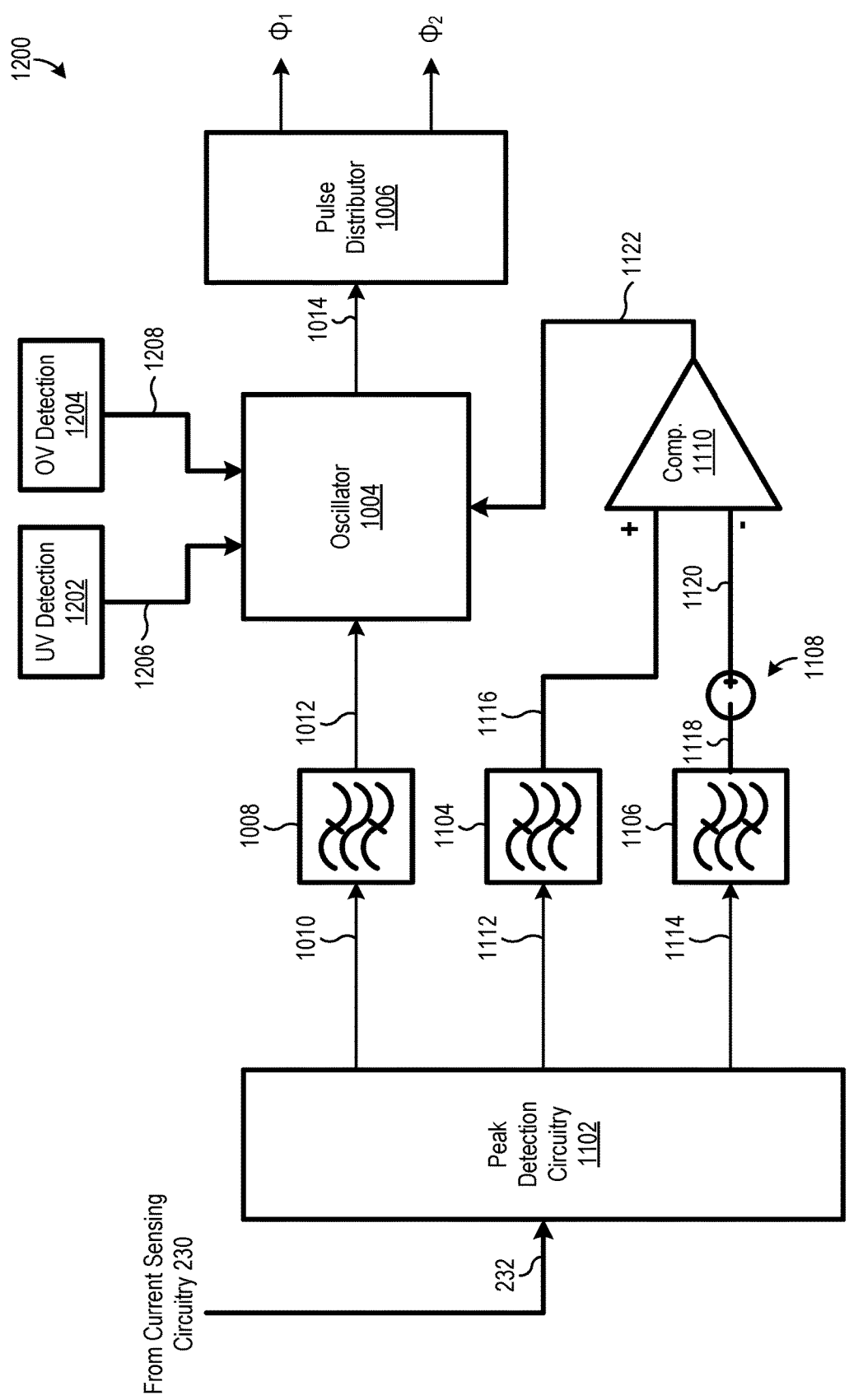
FIG. 12 is a schematic diagram illustrating a controller that is similar to the FIG. 11 controller but including additional circuitry to enable the controller to quickly increase switching frequency in response to an over-voltage condition or an under-voltage condition, according to an embodiment.

Controllers 1000 and 1100 could be modified to increase switching frequency in response to additional events, such as output voltage of STC 200 increasing beyond a threshold value and/or output voltage of STC 200 falling below a threshold value. For example, FIG. 12 is a schematic diagram illustrating a controller 1200 which is similar to controller 1100 of FIG. 11 but further including additional circuitry to enable controller 1200 to quickly increase switching frequency in response to either an under-voltage (UV) or over-voltage (OV) condition in STC 2000. Controller 1200 includes UV detection circuitry 1202 and OV detection circuitry 1204 in addition to the elements of controller 1100. Although FIG. 12 illustrates each of peak detection circuitry 1102, oscillator 1004, pulse distributor 1006, low-pass filter 1008, low-pass filter 1104, low-pass filter 1106, threshold voltage source 1108, comparator 1110, UV detection circuitry 1202, and OV detection circuitry 1204 as being separate elements, two or more of these elements may be combined without departing from the scope hereof. Controller 1200 is implemented, for example, by analog circuitry and/or digital circuitry. In some embodiments, controller 1200 includes a processor executing instructions stored in a memory to perform one or more of the functions of controller 1200.

UV detection circuitry 1202 is configured to assert an UV signal 1206 in response to an output voltage of STC 200, e.g., voltage $V_2$ in FIG. 3 and voltage $V_1$ in FIG. 4, crossing, i.e., dropping below, an UV threshold value. OV detection circuitry 1204 is configured to assert an OV signal 1208 in response to the output voltage of STC 200 crossing, i.e., rising above, an OV threshold value, where the OV threshold value is greater than the UV threshold value.

Oscillator 1004 responds to either UV signal 1206 or OV signal 1208 by increasing magnitude of oscillator signal 1014, which causes switching frequency of STC 200 to increase. Accordingly, controller 1200 is configured to quickly increase the switching frequency of STC 200 in response to either a UV condition or an OV condition.

Figure 13:
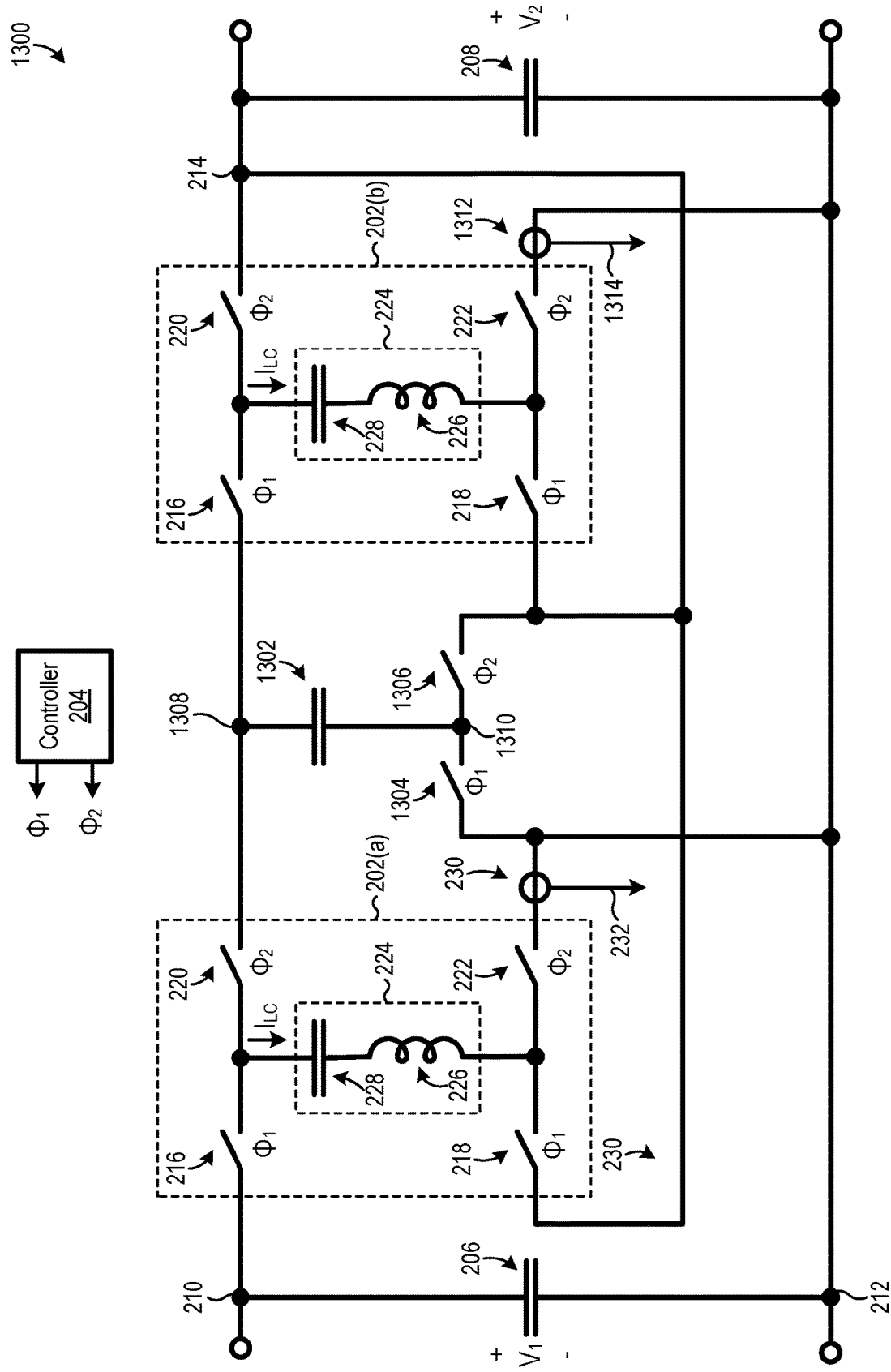
FIG. 13 is a schematic diagram illustrating a variable switching frequency STC including two power stages, according to an embodiment.

STC 200 could be modified to have one or more additional power stages electrically coupled in series and/or parallel with power stage 202. For example, FIG. 13 is a schematic diagram illustrating a STC 1300, which is an alternate embodiment of STC 200 which includes two instances of power stage 202, hereinafter referred to as power stage 202(a) and power stage 202(b). STC 1300 could be modified to include additional power stages 202 without departing from the scope hereof. STC 1300 additionally includes a bulk capacitor 1302, a first bulk switching device 1304, and a second bulk switching device 1306. First switching device 216 and second switching device 218 of power stage 202(a) are electrically coupled to first power node 210 and second power node 214, respectively. Third switching device 220 of power stage 202(a) is electrically coupled to a bulk node 1308, and fourth switching device 222 of power stage 202(a) is electrically coupled to reference node 212. First switching device 216 and second switching device 218 of power stage 202(b) are electrically coupled to bulk node 1308 and second power node 214, respectively. Third switching device 220 and fourth switching device 222 of power stage 202(b) are electrically coupled to second power node 214 and reference node 212, respectively.

Bulk capacitor 1302 is electrically coupled between bulk node 1308 and a switching node 1310. First bulk switching device 1304 is electrically coupled between switching node 1310 and reference node 212, and second bulk switching device 1306 is electrically coupled between switching node 1310 and second power node 214. First bulk switching device 1304 is controlled by first control signal $\phi_1$ generated by controller 204. Specifically, first bulk switching device 1304 operates in its closed or "on" state when first control signal $\phi_1$ is asserted, and first bulk switching device 1304 operates in its open or "off" state when first control signal $\phi_1$ is de-asserted. Second bulk switching device 1306 is controlled by second control signal $\phi_2$ generated by controller 204. Specifically, second bulk switching device 1306 operates in its closed or "on" state when second control signal $\phi_2$ is asserted, and second bulk switching device 1306 operates in its open or "off" state when second control signal $\phi_2$ is de-asserted. Connections between controller 204 and switching devices are not shown in FIG. 13 to promote illustrative clarity.

STC 1300 optionally further includes current sensing circuitry configured to determine magnitude of current flowing through the STC. For example, FIG. 13 illustrates STC 200 including optional current sensing circuitry 230 and 1312. Current sensing circuitry 230 is configured to generate a current sense signal 232 representing magnitude of current through the second pair of switching devices (third switching device 220 and second switching device 222) of power stage 202(a), and current sensing circuitry 1312 is configured to generate a current sense signal 1314 representing magnitude of current through the second pair of switching devices (third switching device 220 and second switching device 222) of power stage 202(b). The configuration of optional current sensing circuit 230 and 1312 could be modified without departing from the scope hereof. For example, in an alternate embodiment, current sensing circuitry 230 and 1312 is configured to generate current sense signals 232 and 1314, respectively, representing magnitude of current through the first pair of switching devices (first switching device 216 and second switching device 218) of its respective power stage 204. As another example, in another alternate embodiment, each of current sensing circuitry 230 and 1312 is configured to generate two current sense signals representing magnitude of current through two different portions of its respective power stage 202.

Figure 14:
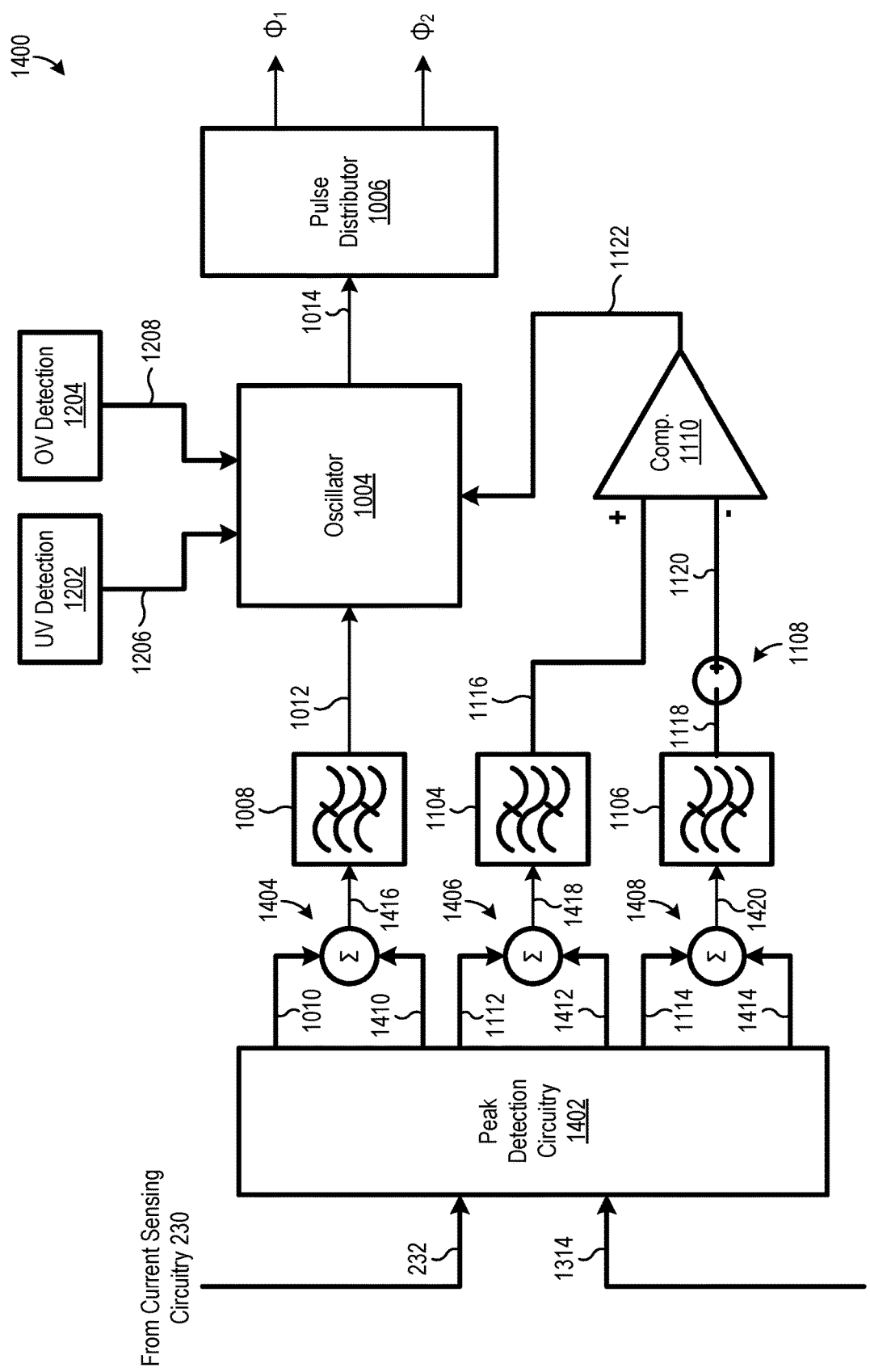
FIG. 14 is a schematic diagram illustrating a controller which is similar to the FIG. 12 controller but modified for use with two power stages, according to an embodiment.

A ratio of voltage $V_2$ to voltage $V_1$ is approximately 0.25 during operation of STC 1300. While not required, in some embodiments of STC 1300, controller 204 is embodied in a manner similar to that discussed above with respect to FIGS. 7-12. For example, in one embodiment of STC 1300, controller 204 is embodied as illustrated in one of FIGS. 7 and 8. As another example, in another embodiment of STC 1300, controller 204 is embodied as illustrated in FIG. 14. FIG. 14 is a schematic diagram illustrating a controller 1400, which is similar to controller 1200 of FIG. 12, but modified for use with two power stages 202. In particular, controller 1400 includes the elements of controller 1200 except that (a) controller 1400 includes peak detection circuitry 1402 in place of peak detection circuitry 1202, and (b) controller 1400 further includes a summing device 1404, a summing device 1406, and a summing device 1408. Although FIG. 14 illustrates each of peak detection circuitry 1402, oscillator 1004, pulse distributor 1006, low-pass filter 1008, low-pass filter 1104, low-pass filter 1106, threshold voltage source 1108, comparator 1110, UV detection circuitry 1202, OV detection circuitry 1204, summing device 1404, summing device 1406, and summing device 1408 as being separate elements, two or more of these elements may be combined without departing from the scope hereof. Controller 1400 is implemented, for example, by analog circuitry and/or digital circuitry. In some embodiments, controller 1400 includes a processor executing instructions stored in a memory to perform one or more of the functions of controller 1400.

Peak detection circuitry 1402 of FIG. 14 is similar to peak detection circuitry 1202 of FIG. 12, but peak detection circuitry 1402 is further configured to generate an envelope signal 1410, a peak envelope signal 1412, and an average envelope signal 1414 in addition to envelope signal 1010, peak envelope signal 1112, and average envelop signal 1114. Envelope signal 1410 represents an envelope of the current sensed by current sensing circuitry 1312, e.g., an envelope of current through the second pair of switching devices of power stage 202(b). Peak envelope signal 1412 represents the peak of the envelope of the current sensed by current sensing circuitry 1312, and average envelope signal 1414 represents the average of the envelope of the current sensed by current sensing circuitry 1312.

Summing device 1404 sums envelope signals 1010 and 1410 to generate a summed envelop signal 1416, and summing device 1406 sums peak envelope signals 1112 and 1412 to generate a summed peak envelope signal 1418. Summing device 1408 sums average envelop signals 1114 and 1414 to generate a summed average envelope signal 1420. Low-pass filter 1008 filters summed envelope signal 1416 to generate filtered envelope signal 1012, and low-pass filter 1104 filters summed peak envelope signal 1418 to generate a filtered peak envelope signal 1116. Low-pass filter 1106 filters average envelope signal 1420 to generate a filtered average envelope signal 1118. Controller 1400 operates according to filtered envelope signal 1012, filtered peak envelope signal 1116, and filtered average envelop signal 1118 as discussed above with respect to FIGS. 10 and 11. Controller 1400 could be modified to support additional power stages 202 by (a) generating an additional envelope signal, peak envelope signal, and average envelope signal for each additional power stage, (b) summing all envelope signals at summing device 1404, (c) summing all filtered envelope signals at summing device 1406, and (d) summing all average envelope signals at summing device 1408.

Figure 15:
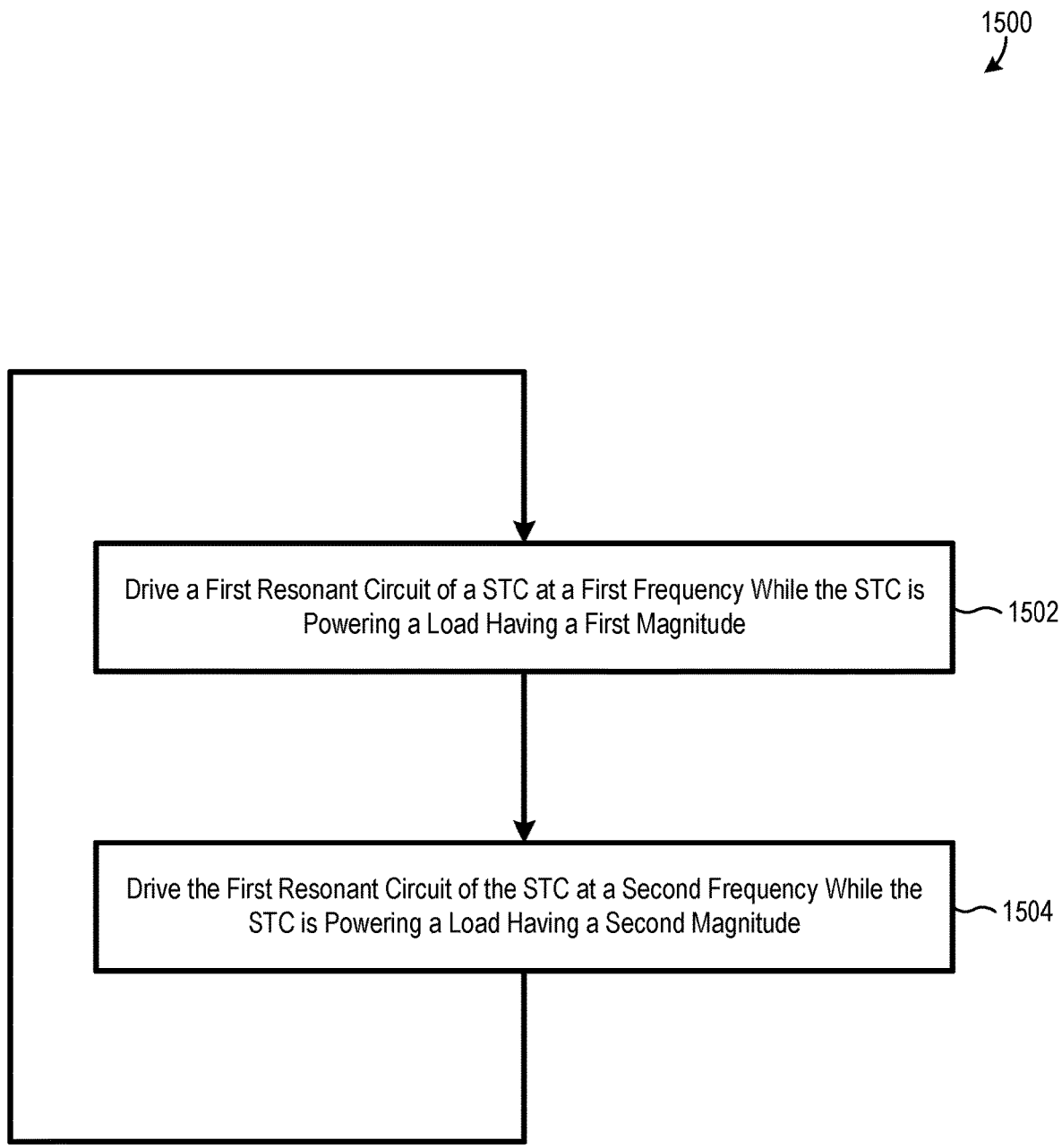
FIG. 15 is a flow chart illustrating a method for controlling a STC, according to an embodiment.

FIG. 15 is a flow chart illustrating a method for controlling a STC. In step 1502, a first resonant tank circuit of the STC is driven at a first frequency while the STC is powering a load having a first magnitude. In one example of step 1502, controller 800 (FIG. 8) initiates driving of resonant tank circuit 224 in response to an output voltage of STC 200 dropping below first threshold value 714 while STC 200 is powering a load having a moderate magnitude, such that STC 200 operates at a first switching frequency. In another example of step 1502, controller 1200 (FIG. 12) causes STC 200 to have a switching frequency that is proportional to an envelope of current through the second pair of switching devices of power stage 202 while STC 200 is powering the load having the moderate magnitude, such that STC 200 operates at the first switching frequency.

In step 1504, the first resonant tank circuit of the STC is driven at a second frequency while the STC is powering a load having a second magnitude, the second frequency being smaller than the first frequency and the second magnitude being smaller than the first magnitude. In one example of step 1402, controller 800 initiates driving of resonant tank circuit 224 in response to the output voltage of STC 200 dropping below first threshold value 714 while STC 200 is powering a load having a small magnitude, such that STC 200 operates at a second switching frequency. In another example of step 1502, controller 1200 causes STC 200 to have a switching frequency that is proportional to an envelope of current through the second pair of switching devices of power stage 202 while STC 200 is powering the load having the small magnitude, such that STC 200 operates at the second switching frequency. Steps 1502 and 1504 optionally indefinitely repeat, as illustrated in FIG. 15.

In some embodiments, controller 204 is further configured to (a) detect a first change in polarity of the load powered by STC 200, (b) in response to the detected first change in polarity of the load, swap phases of first control signal $\phi_1$ and second control signal $\phi_2$, (c) detect a second change in polarity of the load powered by the STC 200, and (d) in response to the detected second change in polarity of the load, again swap phases of first control signal $\phi_1$ and second control signal $\phi_2$. Applicant has found that such swapping of phases can significantly improve transient response during load polarity reversal. In one example of swapping phases of first control signal $\phi_1$ and second control signal $\phi_2$, first control signal $\phi_1$ and second control signal $\phi_2$ initially have respective phases of zero and 180 degrees, and first control signal $\phi_1$ and second control signal $\phi_2$ have respective phases of 180 degrees and zero after swapping of phases. As another example of swapping phases of first control signal $\phi_1$ and second control signal $\phi_2$, first control signal $\phi_1$ and second control signal $\phi_2$ initially have respective phases of zero and 120 degrees, and first control signal $\phi_1$ and second control signal $\phi_2$ have respective phases of 120 degrees and zero after swapping of phases. In certain embodiments, controller 204 is configured to swap phases of first control signal $\phi_1$ and second control signal $\phi_2$ only when both of first control signal $\phi_1$ and second control signal $\phi_2$ are de-asserted.

Figure 16:
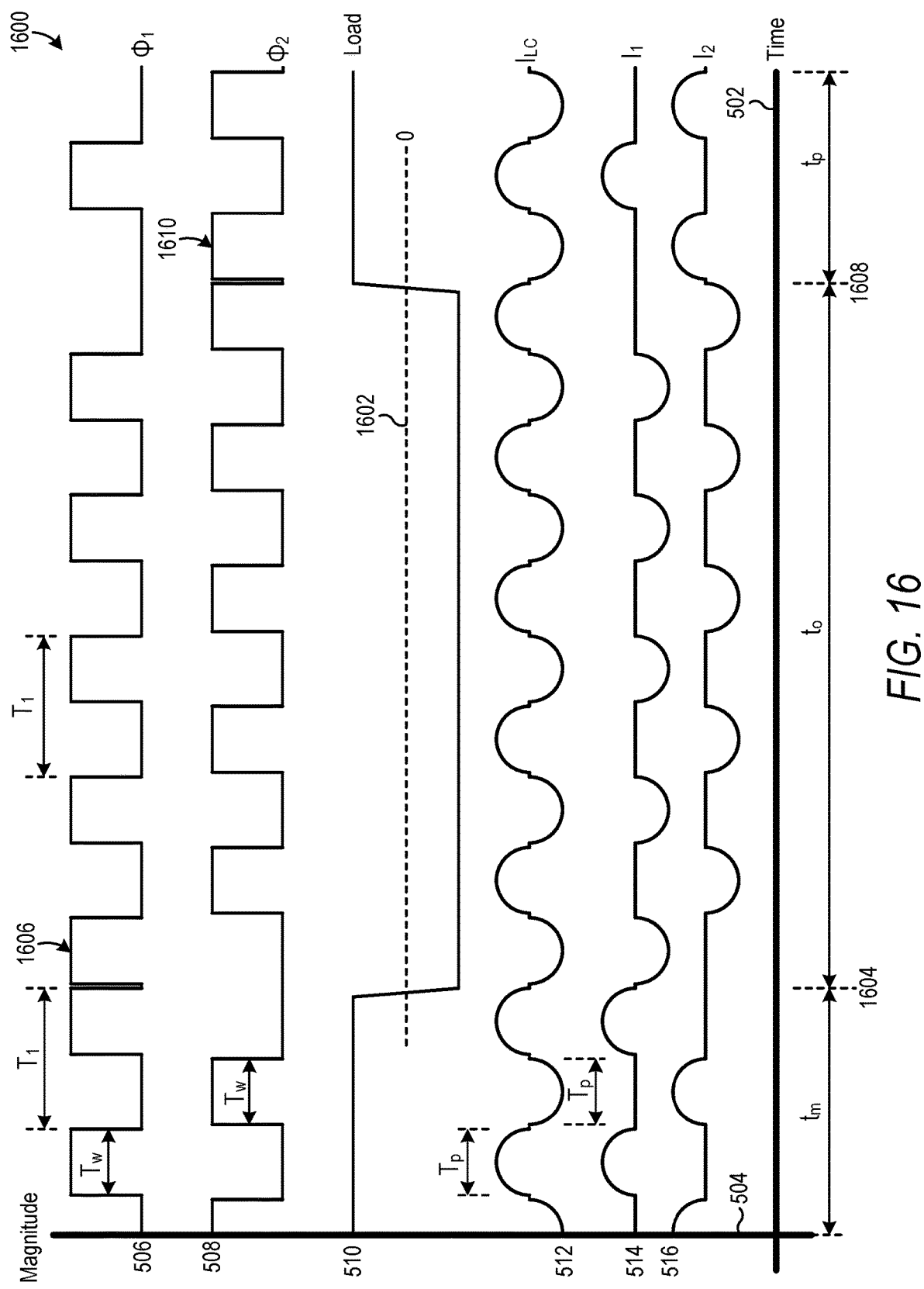
FIG. 16 is a graph illustrating one example of operation of an embodiment of the FIG. 2 STC configured to swap control signal phases in response to a load polarity reversal, according to an embodiment.

FIG. 16 is a graph 1600 illustrating one example of operation of an embodiment of STC 200 where controller 204 is configured to swap phases of first control signal $\phi_1$ and second control signal $\phi_2$ in response to a load polarity reversal. Graph 1600 includes the same curves as graph 500 of FIG. 5. Graph 1600 illustrates an example of operation of STC 200 during time periods $t_m$, $t_o$, and $t_p$. STC 200 operates in time period $t_m$, in the same manner that STC 200 operates in time period $t_a$ of FIG. 5. Polarity of the load powered by STC 200 changes at time 1604 such that magnitude of the load is negative in time period $t_o$, as shown by curve 510 being below a dashed line 1602 representing zero-load. In response to the load polarity changing at time 1604, phases of first control signal $\phi_1$ and second control signal $\phi_2$ are swapped, and first control signal $\phi_1$ therefore has an extra pulse 1606 shortly after time 1604. Additionally, second control signal $\phi_2$ skips a pulse after time 1604. Polarity of the load powered by STC 200 changes again at time 1608 such that magnitude of the load is positive in time period $t_p$, as shown by curve 510 being above dashed line 1602. In response to the load polarity changing at time 1608, phases of first control signal $\phi_1$ and second control signal $\phi_2$ are again swapped, and second control signal $\phi_2$ therefore has an extra pulse 1610 shortly after time 1608. Additionally, first control signal $\phi_1$ skips a pulse after time 1608. Accordingly, the phases of first control signal $\phi_1$ and second control signal $\phi_2$ are swapped in time period $t_o$, and the phases of first control signal $\phi_1$ and second control signal $\phi_2$ are returned to their original values in time period $t_p$.

Figure 17:
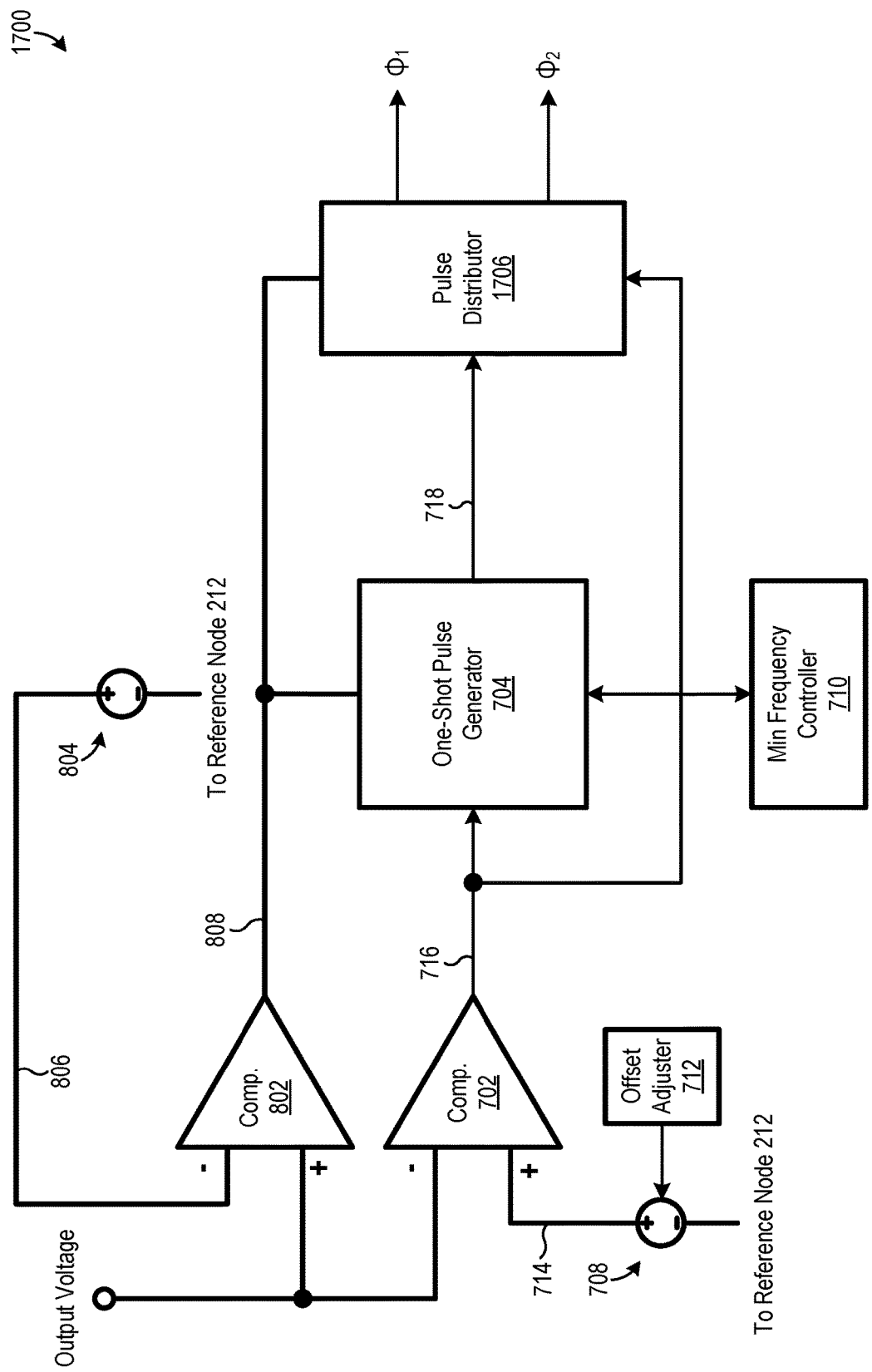
FIG. 17 is a schematic diagram illustrating a controller configured to swap control signal phases in response to a load polarity reversal, according to an embodiment.

FIG. 17 is a schematic diagram illustrating a controller 1700, which is one embodiment of controller 204 that is configured to swap phases of first control signal $\phi_1$ and second control signal $\phi_2$ in response to a load polarity reversal. It should be realized, though, that controller 204 could be implemented in other manners while still being configured to swap phases of first control signal $\phi_1$ and second control signal $\phi_2$ in response to a load polarity reversal. Controller 1700 is similar to controller 800 of FIG. 8, but (a) pulse distributor 706 is replaced with pulse distributor 1706, (b) trigger signal 808 is communicatively coupled to pulse distributor 1706 as well as to one-shot pulse generator 704, and (c) trigger signal 716 is communicatively coupled to pulse distributor 1706 as well as to one-shot pulse generator 704. Pulse distributor 1706 operates like pulse distributor 706, but pulse distributor 1706 is further configured to swap phases of first control signal $\phi_1$ and second control signal $\phi_2$ in response to assertion of trigger signal 808, e.g., in response to load polarity changing from positive to negative. As discussed above, trigger signal 808 is asserted in response to an increase in output voltage due to a change in load polarity. Additionally, pulse distributor 1706 is further configured to swap phases of first control signal $\phi_1$ and second control signal $\phi_2$ in response to assertion of trigger signal 716, e.g., in response to load polarity changing from negative to positive. Controller 1700 otherwise operates in the same manner as controller 800.

Combinations of Features

Features described above may be combined in various ways without departing from the scope hereof. The following examples illustrate some possible combinations:

(A1) A method for controlling a switched tank converter (STC) may include (1) driving a first resonant tank circuit of the STC at a first frequency and with a first fixed on-time, to obtain a first fixed ratio of output voltage of the STC to input voltage of the STC, while the STC is powering a load having a first magnitude and (2) driving the first resonant tank circuit of the STC at a second frequency and with the first fixed on-time, to obtain the first fixed ratio of output voltage of the STC to input voltage of the STC, while the STC is powering a load having a second magnitude, the second frequency being smaller than the first frequency and the second magnitude being smaller than the first magnitude.

(A2) The method denoted as (A1) may further include initiating driving of the first resonant tank circuit of the STC in response to an output voltage of the STC crossing a first threshold value.

(A3) The method denoted as (A2) may further include adjusting the first threshold value such that each pulse of current through the first resonant tank circuit of the STC has a first predetermined magnitude.

(A4) Any one of the methods denoted as (A2) and (A3) may further include initiating driving of the first resonant tank circuit of the STC in response to output voltage of the STC not crossing the first threshold value for a predetermined amount of time.

(A5) Any one of the methods denoted as (A1) through (A4) may further include (1) determining magnitude of current flowing through the STC and (2) controlling the second frequency according to the magnitude of current flowing through the STC.

(A6) The method denoted as (A5) may further include controlling the second frequency such that each pulse of current through the first resonant tank circuit of the STC has a first predetermined magnitude.

(A7) Any one of the methods denoted as (A5) and (A6) may further include increasing a frequency at which the first resonant tank circuit of the STC is driven in response to an increase in magnitude of a load powered by the STC.

(A8) Any one of the methods denoted as (A5) through (A7) may further include increasing a frequency at which the first resonant tank circuit of the STC is driven in response to a change in polarity of a load powered by the STC.

(A9) Any one of the methods denoted as (A5) through (A8) may further include increasing a frequency at which the first resonant tank circuit of the STC is driven in response to a decrease in magnitude of an output voltage of the STC.

(A10) Any one of the methods denoted as (A5) through (A9) may further include increasing a frequency at which the first resonant tank circuit of the STC is driven in response to an increase in magnitude of the output voltage of the STC.

(A11) Any one of the methods denoted as (A1) through (A10) may further include (1) driving a second resonant tank circuit of the STC at the first frequency while the STC is powering the load having the first magnitude and (2) driving the second resonant tank circuit of the STC at the second frequency while the STC is powering the load having the second magnitude.

(A12) Any one of the methods denoted as (A1) through (A11) may further include preventing the second frequency from falling below a second threshold value.

(A13) Any one of the methods denoted as (A1) through (A12) may further include (1) driving the first resonant tank circuit of the STC at the first frequency while the STC is powering the load having the first magnitude such that each pulse of current through the resonant tank circuit of the STC has a first duration and (2) driving the first resonant tank circuit of the STC at the second frequency while the STC is powering the load having the second magnitude such that each pulse of current through the resonant tank circuit of the STC has the first duration.

(A14) In the method denoted as (A13), the first duration may be a resonant half-period of the first resonant tank circuit of the STC.

(A15) In any one of the methods denoted as (A1) through (A14), driving the first resonant tank circuit of the STC at the first frequency while the STC is powering the load having the first magnitude may include alternately driving the first resonant tank circuit with a first pair of switching devices and a second pair of switching devices, and driving the first resonant tank circuit of the STC at the second frequency while the STC is powering the load having the second magnitude may include alternately driving the first resonant tank circuit with the first pair of switching devices and the second pair of switching devices.

(A16) The method denoted as (A15) may further include (1) controlling the first pair of switching devices and the second pair of switching devices with a first control signal and a second control signal, respectively, and (2) in response to a change in polarity of the load, swapping phases of the first control signal and the second control signal.

((B1) A variable switching frequency switched tank converter (STC) may include (1) a first resonant tank circuit, (2) a first pair of switching devices configured to drive the first resonant tank circuit, (3) a second pair of switching devices configured to drive the first resonant tank circuit, (4) and a controller configured to: (a) control the first pair of switching devices and the second pair of switching devices to drive the first resonant tank circuit at a first frequency and with a first fixed on-time, to obtain a first fixed ratio of output voltage of the STC to input voltage of the STC, while the STC is powering a load having a first magnitude, and (b) control the first pair of switching devices and the second pair of switching devices to drive the first resonant tank circuit at a second frequency and with the first fixed on-time, to obtain the first fixed ratio of output voltage of the STC to input voltage of the STC, while the STC is powering a load having a second magnitude, the second frequency being smaller than the first frequency and the second magnitude being smaller than the first magnitude.

((B2) In the STC denoted as (B1), the first pair of switching devices may include first and second switching devices each electrically coupled in series with the first resonant tank circuit, and the second pair of switching devices may include third and fourth switching devices each electrically coupled in series with the first resonant tank circuit.

(B3) In any one of the STCs denoted as (B1) and (B2), the controller may be further configured to control the first pair of switching devices and the second pair of switching devices to alternately drive the first resonant tank circuit with the first pair of switching devices and the second pair of switching devices.

(B4) Any one of the STCs denoted as (B1) through (B3) may further include (1) a second resonant tank circuit, (2) a third pair of switching devices configured to drive the second resonant tank circuit, and (3) a fourth pair of switching devices configured to drive the second resonant tank circuit, where the controller is further configured to: (1) control the third pair of switching devices and the fourth pair of switching devices to drive the second resonant tank circuit of the STC at the first frequency while the STC is powering the load having the first magnitude, and (2) control the third pair of switching devices and the fourth pair of switching devices to drive the second resonant tank circuit at the second frequency while the STC is powering the load having the second magnitude.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for controlling a switched tank converter (STC), comprising:
    driving a first resonant tank circuit of the STC with two control signals each control signal at a first frequency and each control signal with a first fixed on-time and a first phase difference between the two control signals to obtain a first fixed ratio of output voltage of the STC to input voltage of the STC, while the STC is powering a load having a first magnitude; and
    driving the first resonant tank circuit of the STC with the two control signals, each control signal at a second frequency and with the first fixed on-time and a second phase difference between the two control signals, to obtain the first fixed ratio of output voltage of the STC to input voltage of the STC, while the STC is powering a load having a second magnitude, the second frequency being smaller than the first frequency and the second magnitude being smaller than the first magnitude.

2. The method of claim 1, further comprising initiating driving of the first resonant tank circuit of the STC in response to an output voltage of the STC crossing a first threshold value.

3. The method of claim 2, further comprising adjusting the first threshold value such that each pulse of current through the first resonant tank circuit of the STC has a first predetermined magnitude.

4. The method of claim 2, further comprising initiating driving of the first resonant tank circuit of the STC in response to output voltage of the STC not crossing the first threshold value for a predetermined amount of time.

5. The method of claim 1, further comprising:
    determining magnitude of current flowing through the STC; and
    controlling the second frequency according to the magnitude of current flowing through the STC.

6. The method of claim 5, further comprising controlling the second frequency such that each pulse of current through the first resonant tank circuit of the STC has a first predetermined magnitude.

7. The method of claim 6, further comprising increasing a frequency of the two control signals at which the first resonant tank circuit of the STC is driven in response to an increase in magnitude of a load powered by the STC.

8. The method of claim 5, further comprising increasing a frequency of the two control signals at which the first resonant tank circuit of the STC is driven in response to a change in polarity of a load powered by the STC.

9. The method of claim 5, further comprising increasing a frequency of the two control signals at which the first resonant tank circuit of the STC is driven in response to a decrease in magnitude of an output voltage of the STC.

10. The method of claim 5, further comprising increasing a frequency of the two control signals at which the first resonant tank circuit of the STC is driven in response to an increase in magnitude of the output voltage of the STC.

11. The method of claim 1, further comprising:
driving a second resonant tank circuit of the STC with the two control signals at the first frequency while the STC is powering the load having the first magnitude; and
driving the second resonant tank circuit of the STC with the two control signals at the second frequency while the STC is powering the load having the second magnitude.

12. The method of claim 1, further comprising preventing the second frequency from falling below a second threshold value.

13. The method of claim 1, further comprising:
driving the first resonant tank circuit of the STC at the first frequency while the STC is powering the load having the first magnitude such that each pulse of current through the resonant tank circuit of the STC has a first duration; and
driving the first resonant tank circuit of the STC at the second frequency while the STC is powering the load having the second magnitude such that each pulse of current through the resonant tank circuit of the STC has the first duration.

14. The method of claim 13, wherein the first duration is a resonant half-period of the first resonant tank circuit of the STC.

15. The method of claim 1, wherein:
driving the first resonant tank circuit of the STC at the first frequency while the STC is powering the load having the first magnitude comprises alternately driving the first resonant tank circuit with a first pair of switching devices with the first control signal and a second pair of switching devices with the second control signal; and
driving the first resonant tank circuit of the STC at the second frequency while the STC is powering the load having the second magnitude comprises alternately driving the first resonant tank circuit with the first pair of switching devices and the second pair of switching devices.

16. The method of claim 15, further comprising:
controlling the first pair of switching devices and the second pair of switching devices with the first control signal and the second control signal, respectively; and
in response to a change in polarity of the load, swapping phases of the first control signal and the second control signal.

17. A variable switching frequency switched tank converter (STC), comprising:
a first resonant tank circuit;
a first pair of switching devices configured to drive the first resonant tank circuit;
a first control signal configured to control the first pair of switching devices;
a second pair of switching devices configured to drive the first resonant tank circuit;
a second control signal configured to control the second pair of switching devices; and
a controller configured to:
control the first pair of switching devices and the second pair of switching devices to drive the first resonant tank circuit at a first frequency and with a first fixed on-time and a first phase difference between the first and second control signals, to obtain a first fixed ratio of output voltage of the STC to input voltage of the STC, while the STC is powering a load having a first magnitude, and
control the first pair of switching devices and the second pair of switching devices to drive the first resonant tank circuit at a second frequency and with the first fixed on-time, and a second phase difference between the first and second control signals to obtain the first fixed ratio of output voltage of the STC to input voltage of the STC, while the STC is powering a load having a second magnitude, the second frequency being smaller than the first frequency and the second magnitude being smaller than the first magnitude.

18. The STC of claim 17, wherein:
the first pair of switching devices comprises first and second switching devices each electrically coupled in series with the first resonant tank circuit; and
the second pair of switching devices comprises third and fourth switching devices each electrically coupled in series with the first resonant tank circuit.

19. The STC of claim 17, wherein the controller is further configured to control the first pair of switching devices and the second pair of switching devices to alternately drive the first resonant tank circuit with the first pair of switching devices and the second pair of switching devices.

20. The STC of claim 17, further comprising:
a second resonant tank circuit;
a third pair of switching devices configured to drive the second resonant tank circuit; and
a fourth pair of switching devices configured to drive the second resonant tank circuit;
wherein the controller is further configured to:
control the third pair of switching devices with the first control signal and the fourth pair of switching devices with the second control signal to drive the second resonant tank circuit of the STC at the first frequency while the STC is powering the load having the first magnitude, and
control the third pair of switching devices with the first control signal and the fourth pair of switching devices with the second control signal to drive the second resonant tank circuit at the second frequency while the STC is powering the load having the second magnitude.

* * * * *